US012229700B2

(12) United States Patent
Erramilli et al.

(10) Patent No.: US 12,229,700 B2
(45) Date of Patent: Feb. 18, 2025

(54) GENERATING A GLOBAL WORKFLOW SEQUENCE FOR MULTIPLE WORKFLOW STAGES

(71) Applicant: OPTESSA INC., Hazlet, NJ (US)

(72) Inventors: Ashok Erramilli, Holmdel, NJ (US); Bradley Allen Baynes, Spruce Grove (CA); Amit Lonkar, Edmonton (CA); Erwin Savio Paes, Fort Saskatchewan (CA); Srinivas Netrakanti, Edmonton (CA)

(73) Assignee: OPTESSA INC., Hazlet, NJ (US)

( * ) Notice: Subject to any disclaimer, the term of this patent is extended or adjusted under 35 U.S.C. 154(b) by 227 days.

(21) Appl. No.: 15/914,523

(22) Filed: Mar. 7, 2018

(65) Prior Publication Data

US 2019/0279126 A1  Sep. 12, 2019

(51) Int. Cl.
*G06Q 10/0633* (2023.01)
*G06Q 10/1093* (2023.01)

(52) U.S. Cl.
CPC ..... *G06Q 10/0633* (2013.01); *G06Q 10/1093* (2013.01)

(58) Field of Classification Search
CPC ........... G06Q 10/0633; G06Q 10/1093; G06Q 10/06316; G06Q 10/103; G06Q 10/1097; G06Q 10/0631; G06Q 50/04; G05B 19/418; G05B 19/41865; G05B 2219/31449; G05B 2219/32291
See application file for complete search history.

(56) References Cited

U.S. PATENT DOCUMENTS

| 5,808,891 A | 9/1998 | Lee et al. |
| 6,546,364 B1 * | 4/2003 | Smirnov ............... G06Q 10/06 703/22 |

(Continued)

FOREIGN PATENT DOCUMENTS

CA    2890024 A1 *  6/2014  ............... G06F 9/48

OTHER PUBLICATIONS

Garg, Umang, et al. "MAC and logical addressing (A Review Study)." Int. J. Eng. Res. Appl.(IJERA) (2012). (Year: 2012).*

(Continued)

*Primary Examiner* — Mehmet Yesildag
*Assistant Examiner* — Thomas Yih Ho
(74) *Attorney, Agent, or Firm* — CHIP LAW GROUP

(57) ABSTRACT

A planning and scheduling system, which handles generation of a global workflow sequence for multiple workflow stages of a workflow unit, determines a first workflow sequence for a primary workflow stage of the workflow unit for a plurality of product items. The one or more second workflow sequences are generated for one or more secondary workflow stages of the workflow unit concurrently based on a transformation of the determined first workflow sequence. A global workflow sequence is obtained for the primary workflow stage and the one or more secondary workflow stages based on at least the determined first workflow sequence for the primary workflow stage and the generated one or more second workflow sequences. A set of operations for the plurality of product items is executed based on the obtained global workflow sequence to maximize a performance score for the executed set of operations on the plurality of product items.

31 Claims, 15 Drawing Sheets

(56) References Cited

U.S. PATENT DOCUMENTS

| | | | |
|---|---|---|---|
| 7,805,327 B1* | 9/2010 | Schulz | G06Q 10/06316 |
| | | | 705/7.26 |
| 9,141,581 B2 | 9/2015 | Sun et al. | |
| 10,032,136 B1* | 7/2018 | Hamilton | G06Q 10/0633 |
| 11,663,051 B2* | 5/2023 | Vasileiadis | G06F 9/4887 |
| | | | 718/105 |
| 2002/0128890 A1* | 9/2002 | Dick | G06Q 10/06 |
| | | | 705/7.26 |
| 2003/0078820 A1* | 4/2003 | Ouchi | G06Q 10/10 |
| | | | 705/7.26 |
| 2003/0195763 A1* | 10/2003 | Gulcu | G06Q 10/0633 |
| | | | 705/7.27 |
| 2004/0030428 A1 | 2/2004 | Crampton et al. | |
| 2005/0163975 A1 | 7/2005 | Chen et al. | |
| 2005/0256818 A1* | 11/2005 | Sun | G06Q 10/06316 |
| | | | 705/301 |
| 2006/0101052 A1* | 5/2006 | Netrakanti | G06Q 10/00 |
| | | | 707/999.102 |
| 2007/0174101 A1* | 7/2007 | Li | G06Q 10/063 |
| | | | 705/7.26 |
| 2008/0065448 A1* | 3/2008 | Hull | G06Q 10/06 |
| | | | 705/7.26 |
| 2009/0210076 A1* | 8/2009 | Erramilli | G06N 5/04 |
| | | | 700/36 |
| 2014/0067457 A1* | 3/2014 | Nagendra | G06Q 10/0633 |
| | | | 705/7.27 |
| 2014/0164044 A1* | 6/2014 | DeRoller | G06Q 10/103 |
| | | | 705/7.22 |
| 2014/0222492 A1* | 8/2014 | Furbeck | G06Q 10/06316 |
| | | | 705/7.26 |
| 2014/0281712 A1* | 9/2014 | Subbu | G06F 11/26 |
| | | | 714/25 |
| 2014/0297354 A1* | 10/2014 | Kogiso | G06Q 10/06316 |
| | | | 705/7.26 |
| 2014/0310047 A1* | 10/2014 | De | G06Q 10/103 |
| | | | 705/7.21 |
| 2015/0324893 A1* | 11/2015 | Langen | B65B 43/145 |
| | | | 705/26.81 |
| 2017/0327247 A1* | 11/2017 | Dike | G05B 19/41865 |
| 2017/0337492 A1* | 11/2017 | Chen | G06Q 10/06316 |
| 2018/0096286 A1* | 4/2018 | Cook | G06Q 10/063116 |
| 2018/0322425 A1* | 11/2018 | DeHart | G06Q 10/0633 |

OTHER PUBLICATIONS

Gunawan, Indra, and Kamrul Ahsan. "Project scheduling improvement using design structure matrix." International Journal of Project Organisation and Management 2.4 (2010): 311-327. (Year: 2010).*

Kumar, Akhil, Sharat R. Sabbella, and Russell R. Barton. "Managing controlled violation of temporal process constraints." Business Process Management: 13th International Conference, BPM 2015, Innsbruck, Austria, Aug. 31-Sep. 3, 2015, Proceedings 13. Springer International Publishing, 2015. (Year: 2015).*

Xu, Jiajie, et al. "Resource management for business process scheduling in the presence of availability constraints." ACM Transactions on Management Information Systems (TMIS) 7.3 (2016): 1-26. (Year: 2016).*

Kumar, Akhil, and Russell R. Barton. "Controlled violation of temporal process constraints-models, algorithms and results." Information Systems 64 (2017): 410-424. (Year: 2017).*

Nguyen, Phuong, and Klara Nahrstedt. "Monad: Self-adaptive micro-service infrastructure for heterogeneous scientific workflows." 2017 IEEE International Conference on Autonomic Computing (ICAC). IEEE, 2017. (Year: 2017).*

Mahdieh, M. (2013) Integrated capacitated lot sizing and scheduling problems in a flexible flow line. PhD, University of the West of England, 113 pages.

Seeanner, Multi-stage simultaneous lot-sizing and schedulingfor flow line production, OR Spectrum, 35:33-73 (2013), 2 pages.

* cited by examiner

GENERATING A GLOBAL WORKFLOW SEQUENCE FOR MULTIPLE WORKFLOW STAGES

CROSS-REFERENCE TO RELATED APPLICATIONS/INCORPORATION BY REFERENCE

Not Applicable.

FIELD OF TECHNOLOGY

Certain embodiments of the present disclosure relate to industrial operations and management system. More specifically, certain embodiments of the present disclosure relate to a method and system for generation of a global workflow sequence for multiple workflow stages in an industrial environment.

BACKGROUND

Typically, an industrial environment encompasses various operational design flow lines with different operations associated with varying complexities. Such operations are performed at multiple stages and require proper control and management methods. Examples of such control and management methods may include planning, scheduling, and other assessments of various supply chain factors (such as inventory, purchase order, production deadlines, quality control, and the like). Generally, each stage is designated for a specific set of operations and associated with a set of constraints that have to be considered during planning and scheduling. For example, a paint shop stage in an auto production facility may be designated for painting a product and associated with a constraint that restricts certain transitions of colors to paint consecutive product items in line; this is done to avoid possible intermixing of these colors.

Currently, such a planning and scheduling problem is solved based on decomposition of the complex problem into granular sub-problems. One of the sub-problems is selected and an optimal solution is determined therefrom. The solution is further used as an input to solve the next sub-problem. Thus, each sub-problem is solved separately in a chain to obtain a holistic solution for the complex planning and scheduling problem. Now in case the granular sub-problems are independent of each other, then the decomposition approach may be efficient. However, in case the granular sub-problems are dependent on each other, the determined solution may be sub-optimal and inefficient due to violation of constraints associated with the sub-problems. This will result in higher costs due to wastage of inventories, excessive manpower, reduced throughput, missed delivery dates, material wastage, and supply chain instability. Additionally, significant delay may be observed while generating the solution due to cumulative delays in the serial processing of the granular sub-problems in the chain. Therefore, a holistic, robust, and systemic approach is required to overcome the deficiencies in the art.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for the holistic generation of a global workflow sequence for multiple workflow stages in an industrial environment, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
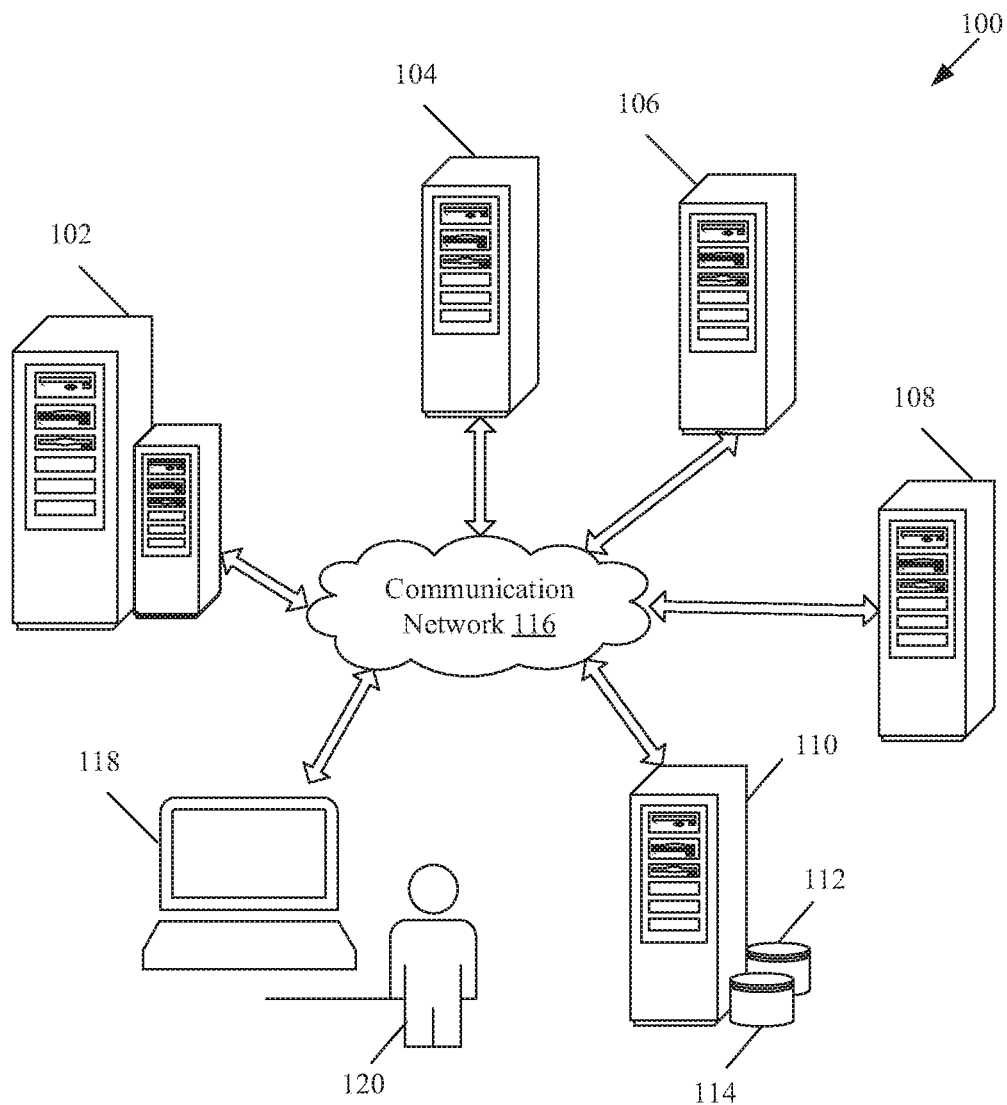
FIG. 1 is a block diagram that illustrates an exemplary network environment for a system for generation of a global workflow sequence for multiple workflow stages in an industrial environment, in accordance with various exemplary embodiments of the present disclosure.

Certain embodiments of the present disclosure may be found in a method and system for generation of a global workflow sequence for multiple workflow stages in an industrial environment. Various embodiments of the present disclosure provide a system that may include a plurality of circuits in a computing device. The plurality of circuits may be configured to determine a first workflow sequence for a primary workflow stage of a workflow unit for a plurality of product items. The criteria for the determination of the first workflow sequence may be defined with reference to a set of operations on the plurality of product items in the workflow unit. The first workflow sequence may be in accordance with a first set of constraints associated with the primary workflow stage. In accordance with an embodiment, the plurality of circuits may be configured to generate the first workflow sequence for the primary workflow stage based on minimal violations of at least one of the first set of constraints. In accordance with another embodiment, the plurality of circuits may be configured to retrieve content from a memory device for the determination of the first workflow sequence for the primary workflow stage.

The plurality of circuits may be further configured to generate one or more second workflow sequences for one or more secondary workflow stages of the workflow unit concurrently. The generation of the one or more secondary workflow sequences may be based on a transformation of the determined first workflow sequence. The generated one or more second workflow sequences may be in accordance with corresponding one or more second set of constraints. The one or more second set of constraints may be associated with the one or more secondary workflow stages. The first workflow sequence and the one or more second workflow sequences may be dependent on one another. In accordance with an embodiment, the one or more second workflow sequences may be dependent on the first workflow sequence based on at least one of an extended lead time, an extended lag time, a pull ahead, a number of flow routes, a re-entrant flow, a partial route, and a variable process time.

The plurality of circuits may be further configured to obtain a global workflow sequence for the primary workflow stage and the one or more secondary workflow stages. The global workflow sequence may be obtained based on at least the determined first workflow sequence for the primary workflow stage and the generated one or more second workflow sequences for one or more secondary workflow stages of the workflow unit. In accordance with an embodiment, the obtained global workflow sequence for the primary workflow stage and the one or more secondary workflow stages may correspond to a global schedule for production of the plurality of product items. Such global schedule may comprise a plurality of time durations for different jobs in the primary workflow stage and the one or more secondary workflow stages.

The plurality of circuits may be further configured to execute a set of operations for the plurality of product items. The set of operations may be executed based on the obtained global workflow sequence. Further, the set of operations may be executed to maximize a performance score of the executed set of operations on the plurality of product items. The maximization of the performance score may be further based on a penalty score associated with a violation of at least one of the first set of constraints for the primary workflow stage and the one or more second set of constraints for the one or more secondary workflow stages. The managed set of parameters may include, but are not limited to, at least one of an operational delay, a sequential delay, a routing delay, a re-entrant flow delay, and a quality assessment delay. The set of parameters may be managed for the primary workflow stage and the one or more secondary workflow stages concurrently.

In accordance with an embodiment, the first workflow sequence may correspond to a plurality of primary slots. The plurality of primary slots may indicate sequence positions of a job in the first workflow sequence. Each of the one or more second workflow sequences may correspond to a plurality of secondary slots. The plurality of secondary slots may indicate other sequence positions of the job in the one or more second workflow sequences. The first workflow sequence may further correspond to a primary lot. The primary lot may indicate a type or features of the job to be performed in the primary workflow stage. Each of the one or more second workflow sequences may further correspond to a secondary lot. The secondary lot may indicate the job to be performed in a corresponding secondary workflow stage.

In accordance with an embodiment, the plurality of circuits may be configured to determine a primary slot in the primary workflow stage for each of the plurality of secondary slots in each of the one or more secondary workflow stages. The primary slot may be determined based on at least one of a first correspondence table and a second correspondence table. In accordance with an embodiment, the first correspondence table may correspond to a timing correspondence table (TCT) and the second correspondence table may correspond to a routing correspondence table (RCT). In accordance with an embodiment, the TCT may be a data structure that may include a mapping of each of a plurality of secondary slots with a corresponding primary slot of a plurality of primary slots. The plurality of secondary slots may be mapped with the corresponding primary slot in absence of a sequential displacement. In accordance with an embodiment, the RCT may be a data structure that may include a mapping of each of a plurality of secondary slots with a corresponding primary slot of a plurality of primary slots. The plurality of secondary slots may be mapped with the corresponding primary slot in accordance with application of a sequential displacement to the TCT.

The plurality of circuits may be further configured to assign a primary lot for the determined primary slot based on an analysis of the first workflow sequence for the primary workflow stage. The plurality of circuits may be further configured to determine a secondary lot in each of the one or more secondary workflow stages. The secondary lot may correspond to the determined primary slot. The plurality of circuits may be further configured to determine a sequential displacement based on a combination of a plurality of secondary lots and the plurality of secondary slots in each of the one or more secondary workflow stages. The sequential displacement may be based on at least one of an extended lead time or a variable process time in which the one or more secondary workflow sequences may be determined with respect to the first workflow sequence.

The plurality of circuits may be further configured to determine a location of the secondary lot based on the application of the determined sequential displacement from a current secondary slot. The one or more second workflow sequences for one or more secondary workflow stages of the workflow unit may be generated in a first pass or a second pass. In accordance with an embodiment, the plurality of circuits may be configured to assign the secondary lot with non-zero sequential displacement to a corresponding secondary slot in the first pass. In accordance with another embodiment, the plurality of circuits may be configured to assign the secondary lot with zero sequential displacement to an available secondary slot in the second pass. The sequential displacement may be one of a positive sequential displacement in presence of an extended lead time and a negative sequential displacement in presence of the extended lag time.

In accordance with an embodiment, the plurality of circuits may be further configured to generate a new first workflow sequence for the primary workflow stage. Based on the transformation of the generated new first workflow sequences, one or more new second workflow sequences may be generated for the one or more secondary workflow stages.

In accordance with an embodiment, the transformation of the determined new first workflow sequence may be re-calculated based on a modification in the generated first workflow sequence. Such re-calculation may be done based on dependency of the determined new first workflow sequence on the job (or the lot) and the slot (time duration of operation) in a given workflow stage. Moreover, an extended lead time may be determined based on a plurality of slots and lots in the primary workflow stage and the one or more secondary workflow stages. In accordance with another embodiment, the transformation of the determined new first workflow sequence may be pre-calculated once. A single pre-calculation of the transformation for the new first workflow sequence may be done only when the sequential displacement may depend on the job (or operation of a workflow stage) instead of a slot (or time duration of operation) for a job in the workflow stage.

In accordance with an embodiment, the plurality of circuits may be further configured obtain a penalty score for each workflow stage. The penalty score may be obtained based on an evaluation of the new first workflow sequence for the primary workflow stage and the one or more new second workflow sequences. Further, a cumulative penalty score may be determined for the primary workflow stage and the one or more secondary workflow stages. The new first workflow sequence and the one or more new second workflow sequences may be accepted based on the determined cumulative penalty score. The accepted new first workflow sequence and the one or more new second workflow sequences may correspond to the obtained global workflow sequence. Based on the acceptance of the new first workflow sequence and the one or more new second workflow sequences, the first workflow sequence and the one or more second workflow sequences may be updated with the new first workflow sequence and the one or more new second workflow sequences.

In accordance with an embodiment, the primary workflow stage and the one or more secondary workflow stages may correspond to a serial or parallel arrangement of a plurality of workflow stages in the workflow unit. In accordance with another embodiment, the primary workflow stage and the one or more secondary workflow stages may correspond to a hybrid arrangement of a plurality of workflow stages in the workflow unit. The hybrid arrangement may correspond to a combination of serial and parallel flow lines. Further, the workflow unit may correspond to a manufacturing unit, a fabrication unit, or an assembly unit.

In accordance with an embodiment, the transformation of the determined first workflow sequence to the one or more secondary workflow sequences may be parallelized. For example, secondary workflow sequences for two different secondary stages may be transformed in parallel (concurrently), from the first workflow sequence of a primary workflow stage. In accordance with another embodiment, the transformation of the determined first workflow sequence to the one or more secondary workflow sequences may be at least one of a parallelized type of transformation or a multi-threaded type of transformation. Further, the transformation of the determined first workflow sequence to the one or more secondary workflow sequences may capture the dependencies between the first workflow sequence of the primary workflow stage and the one and more secondary workflow sequences of the one or more secondary workflow stages. The dependencies may be captured as sequential displacements corresponding to the extended lead times or variable process times.

FIG. 1 is a block diagram that illustrates an exemplary network environment for generation of a global workflow sequence for multiple workflow stages in an industrial environment, in accordance with various exemplary embodiments of the present disclosure. With reference to FIG. 1, there is shown an industrial environment 100 that comprises a planning and scheduling server 102, an order assessment server 104, an operations server 106, a monitoring server 108, and a data server 110. The data server 110 may comprise an order database 112 and an operations database 114. The planning and scheduling server 102, the order assessment server 104, the operations server 106, and the monitoring server 108 may be communicatively coupled to the data server 110, via a communication network 116. The industrial environment 100 may further include a client device 118 which may be communicatively coupled to at least one of the planning and scheduling server 102, the order assessment server 104, the operations server 106, the monitoring server 108, and the data server 110, via the communication network 116. Additionally, a user 120, such as an operations manager, may be associated with the client device 118, in accordance with an embodiment of the present disclosure.

The planning and scheduling server 102 may comprise suitable logic, circuitry, and interfaces that may be configured to adaptively execute, control, monitor, schedule, and reschedule a sequential flow of orders in a flow line (FL) of a plurality of product items in the industrial environment 100. In accordance with an embodiment, one or more FL may be represented as a virtual FL (VFL). The planning and scheduling server 102 may be configured to concurrently determine a first workflow sequence for a primary workflow stage and one or more second workflow sequences for one or more secondary workflow stages in the industrial environment 100. The determination of the first workflow sequence and the one or more second workflow sequences may be associated with time-stamped assignment of operational and positional identifiers associated with each product item of the plurality of product items. Further, the planning and scheduling server 102 may be configured to validate a synchronized control and regulation of the set of operations in accordance with the determined first workflow sequence and the one or more second workflow sequences. The set of operations for each workflow sequence may be monitored for delays or other relevant operational and industrial parameters. A performance score may be calculated from the monitoring, control, and feedback mechanisms in the industrial environment 100 during a specific period of operation of a workflow unit. The workflow unit may be characterized as a specialized operations unit, for example, auto assembly line, fabrication unit, or a manufacturing unit that comprises primary plurality of workflow stages dependent on each other.

In accordance with an embodiment, the planning and scheduling server 102 may be located at a customer side, managed by a production control or production planning personnel in associated industrial environments. In such a case, the customer may use a standard application or browser, for example, an interface of a Software as a service (SaaS) application, to provide order requirements to the planning and scheduling server 102. In accordance with another embodiment, the planning and scheduling server 102 may be implemented as a cloud service.

The order assessment server 104 may comprise suitable logic, circuitry, and interfaces that may be configured to execute code that may be configured to handle registration and assessment of orders of the plurality of product items in a supply and management chain of the industrial environment 100. The supply and management chain of the industrial environment 100 may have automated operations, manual operations, or a combination thereof. Each order, associated with a corresponding product item, may be verified and validated prior to the registration of each order. Further, each order, associated with the corresponding product item, may be associated with a set of attributes. The set of attributes may include, but are not limited to, a product category, a product class, an order time, and an estimated or assigned delivery time. The order may be further associated with a price tag or may be assigned a priority tag. Each order for each product item may be segregated and classified into order clusters. Each order cluster may be characterized by a unique product category and product class. The classification, segregation, and prioritization of orders of a product item may be performed by the order assessment server 104. A person ordinary skilled in the art may understand that in FIG. 1, the order assessment server 104 is illustrated to be a separate entity from the planning and scheduling server 102. However, the present disclosure may not be so limited, and the order assessment server 104 may be integrated with the planning and scheduling server 102, without deviation from the scope of the present disclosure.

The operations server 106 may comprise suitable logic, circuitry, and interfaces that may be configured to execute a set of operations on the plurality of product items within a pre-specified execution time in the industrial environment 100. The execution of the set of operations may be performed in a serial flow line (SFL), a parallel FL, or a combination thereof. The sequence of execution of the set of operations may be derived from the first workflow sequence for the primary workflow stage and the one or more second workflow sequences for the one or more secondary workflow stages of the industrial environment 100. Moreover, the operations server 106 may be configured to receive a set of structured data from the operations database 114 of the data server 110 via instructions of the planning and scheduling server 102. The set of structured data pertains to ordered, sequential, and staged schedule of operations and FLs in real time. The set of structured data may be a set of instructions or tables. A person ordinary skilled in the art may understand that in FIG. 1, the operations server 106 is illustrated to be a separate entity from the planning and scheduling server 102. However, the present disclosure may not be so limited, and the operations server 106 may be integrated with the planning and scheduling server 102, without deviation from the scope of the present disclosure.

The monitoring server 108 may comprise suitable logic, circuitry, and interfaces that may be configured to monitor schedule and performance of the operations server 106 with respect to the adherence of the generated plan or schedule in real time. The performance may be monitored based on evaluation of a performance deviation in an allocated execution time of each operation. The performance may be further monitored based on an order completion time and a delay in delivery of order for the validated and registered purchase request. Additionally, the performance of the planning and scheduling server 102 may be monitored in the real time based on adaptability of the planning and scheduling server 102 for determination of optimal workflow sequences in real time with respect to time-based and order demand-based variations. The monitoring server 108 may be configured to automatically generate a monitoring report or an update log for the planning and scheduling server 102 and the operations server 106 for assessment and review of the performance deviations and accounted/unaccounted delays. A person ordinary skilled in the art may understand that in FIG. 1, the monitoring server 108 is illustrated to be a separate entity from the planning and scheduling server 102. However, the present disclosure may not be so limited, and the monitoring server 108 may be integrated with the planning and scheduling server 102, without deviation from the scope of the present disclosure.

The data server 110 may comprise suitable logic, circuitry, and interfaces that may be configured to receive, manage, store and communicate data with at least one or more computing devices via the communication network 116. Example of the one or more computing devices may include, but are not limited to, servers, mobile devices, non-mobile devices, input/output (I/O) devices, and virtual machines. The data server 110 may be configured to manage communication requests from the order assessment server 104, the planning and scheduling server 102, the operations server 106 and the monitoring server 108 in real time. The data server 110 may be configured to store and manage a set of collated or uncollated databases in the real time. The set of collated or uncollated database may include, but are not limited to, the order database 112 and the operations database 114. A person ordinary skilled in the art may understand that in FIG. 1, the data server 110 is illustrated to be a separate entity from the planning and scheduling server 102. However, the present disclosure may not be so limited, and the data server 110 may be integrated with the planning and scheduling server 102, without deviation from the scope of the present disclosure.

The order database 112 may comprise suitable logic, circuitry, and interfaces that may be configured to structurally or non-structurally store order data received from the at least one or more computing devices, via the communication network 116. In general, a structured database is characterized by a defined schema and a non-structured database is characterized by an unstructured schema. An example of the order data may include, but are not limited to, purchase request, billing information, product category, product class, product price, order delivery and processing time, and priority data for the registered orders.

The operations database 114 may comprise suitable logic, circuitry, and interfaces that may be configured to structurally or non-structurally store operations and schedule data from the at least one or more computing devices. An example of the operations and schedule data may include, but are not limited to, operation identifiers, sequence identifiers, product identifiers, correspondence tables, charts, visualizations, operational timestamps, delay durations, deviations, and progress charts.

Additionally, the order database 112 and the operations database 114 may comprise a user table. The user table may comprise at least one of a list of users with associated credentials and corresponding authentication status of each user. Based on the user table, the order database 112 and the operations database 114 may be configured to grant access to one or more users in the list of users for an access request.

The communication network 116 may comprise suitable logic, circuitry, and interfaces that may be configured to provide a plurality of network ports and a plurality of communication channels for transmission and reception of the communication data. Each network port may correspond to a virtual address (or a physical machine address) for transmission and reception of the communication data. For example, the virtual address may be an Internet Protocol version 4 (IPV4) or an Internet Protocol version 6 (IPV6) address and the physical address may be a media access control (MAC) address. An application layer is associated with the communication network 116 for implementation of communication protocols on one or more communication requests from at least one of the one or more computing devices. The communication data may be transmitted via a communication protocol. Examples of the communication protocol may include, but are not limited to, a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT). The communication data may be transmitted via at least one communication channel of the plurality of communication channels. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN) and Wireless Wide Area Network (WWAN). Additionally, the wired channel may be selected on the basis of bandwidth criteria. For example, an optical fiber channel may be used for a high bandwidth communication, and a coaxial cable (or Ethernet-based communication channel) may be used for moderate bandwidth communication.

The client device 118 may comprise suitable logic, circuitry, and interfaces that may be configured to provide one or more input parameters to control and schedule operations for each workflow stage of the industrial environment 100. The one or more input parameters may be provided via an I/O device to a graphical user interface (GUI). The GUI may be configured to present graphical and non-graphical visualizations and application interfaces on the display screen. The client device 118 may comprise a setup of a display screen, I/O devices, a networking interface, a storage device, and a computation unit. Further, the client device 118 may request for an authorization, authentication, or access to the data server 110 in real time. In an exemplary instance, the client device 118 may be configured to display visualization of the scheduled operations and the performance, via a visualization chart. Examples of the visualization chart may include, but are not limited to, a Gantt chart, a Bar chart, a Pie chart, a line chart, and a table. In another exemplary instance, the client device 118 may be configured to transmit manual inputs, received from an associated client, to the planning and scheduling server 102. The manual inputs may be utilized by the planning and scheduling server 102 as parameters that may affect the determination of the first workflow sequence or the generation of the one or more second workflow sequences. Examples of the client device 118 may include, but are not limited to, a mobile phone, a personal computer, a workstation server, a tablet, and a portable computer.

In operation, the order assessment server 104 in the industrial environment 100 of a facility, for example a car manufacturing company, may be configured to receive a plurality of orders for a plurality of product items. The plurality of orders may include order requirements associated with the plurality of product items in accordance with a workflow unit, for example a manufacturing unit. It may be noted that the workflow unit may comprise a plurality of workflow stages, such as a body stage, a paint stage, and a trim stage, managed by the operations server 106. The plurality of workflow stages may comprise a primary workflow stage and one or more secondary workflow stages. Each workflow stage may comprise a set of operations that may be executed by various computing devices, such as the operations server 106, in the industrial environment 100 for order fulfillment. The set of operations may correspond to the application area of the workflow unit in the industrial environment 100.

The order assessment server 104 may receive the plurality of orders from various sources, via the communication network 116. The sources may correspond to dealers or other organizations associated with the industrial environment 100. The order assessment server 104 may be further configured to perform assessment of the plurality of orders based on various criteria, for example, validity of configuration of the plurality of product items as provided in the plurality of orders. Examples of the plurality of orders may include, but are not limited to, a production order, a manufacturing order, a fabrication order, a processing order, a repair order, a refurbishing order and a packaging order. For example, the order assessment server 104 may receive a requirement of "10 orders" of small red cars and "5 orders" of black sedans from a car dealer. The order requirements associated with the plurality of orders may include model numbers, body styles, additional accessories, automatic or manual versions, certain safety features, and the like. In accordance with an embodiment, the order assessment server 104 may be configured to store the plurality of orders characterized by corresponding order requirements in the order database 112. In accordance with another embodiment, the order assessment server 104 may be configured to transmit the duly assessed plurality of orders to the planning and scheduling server 102, via the communication network 116.

The planning and scheduling server 102 may be configured to receive the assessed plurality of orders from the order assessment server 104, via the communication network 116. Alternatively, the planning and scheduling server 102 may be configured to retrieve the assessed plurality of orders from the order database 112, via the communication network 116.

In the first stage, the planning and scheduling server 102 may be configured to perform planning, such as determination of the location and time, for processing orders of the plurality of product items, in accordance with a type of the workflow unit, such as the manufacturing unit, in the industrial environment 100. In accordance with an embodiment, various instances of the workflow unit may be located at geographically different areas. Accordingly, the planning and scheduling server 102 may determine buckets (or bins) to categorize the received plurality of orders.

In the second stage, for each bucket (or bin), the planning and scheduling server 102 may be configured to perform multi-line sequencing based on determination of a near-optimal global workflow sequence with minimum number of violated constraints for the plurality of orders. Accordingly, the planning and scheduling server 102 may be configured to control the sequential flow of the plurality of orders to make the plurality of product items. In other words, the planning and scheduling server 102 may be configured to determine what, when, and where to manufacture the plurality of product items. Specifically, in the second stage, the planning and scheduling server 102 may be configured to determine a first workflow sequence for the primary workflow stage of the workflow unit for the plurality of product items. The determination of the first workflow sequence may be based on a specific criteria. The specific criteria may be defined with reference to the workflow unit for the plurality of product items. For example, car manufacturing company may have a specific criteria of selection of the body workflow stage as the primary workflow sequences and the first workflow sequence may be based on a planned sequence for the body workflow stage.

The planning and scheduling server 102 may be configured to determine the first workflow sequence in accordance with a first set of constraints associated with the primary workflow stage. The planning and scheduling server 102 may be further configured to generate the one or more second workflow sequences for the one or more secondary workflow stages concurrently in real time. The planning and scheduling server 102 may be further configured to generate the one or more second workflow sequences on the basis of a transformation of the determined first workflow sequence. The planning and scheduling server 102 may be configured to generate the one or more second workflow sequences in accordance with corresponding one or more second set of constraints associated with the one or more secondary workflow stages. The first workflow sequence and the one or more second workflow sequences may be dependent on one another. Based on the transformation, the generation of the one or more second workflow sequences is explained in detail in FIG. 2.

The planning and scheduling server 102 may be further configured to obtain a global workflow sequence for the primary workflow stage and the one or more secondary workflow stages. Alternatively stated, the global workflow sequence may be a collection of first workflow sequences of the primary workflow stage and second workflow sequences of the one or more secondary workflow stages. The global workflow sequence is obtained based on at least one of the determined first workflow sequence for the primary workflow stage and the generated one or more second workflow sequences for one or more secondary workflow stages of the workflow unit. Thus, such global workflow sequence may be generated by the planning and scheduling server 102 based on constraints of each of the plurality of workflow stages and interdependencies of the first workflow sequence and the one or more second workflow sequences.

For brevity, it is assumed in FIG. 1 that the global workflow sequence of the first workflow sequence and the one or more second workflow sequences is generated in a very first iteration. However, as described in FIG. 2, the global workflow sequence may be determined after a plurality of iterations for a plurality of candidate workflow sequences, without deviation from the scope of the present disclosure. In such cases, the first workflow sequence and the one or more second workflow sequences may be referred to as candidate workflow sequences.

Based on the global workflow sequence, the planning and scheduling server 102 may be further configured to manage a set of parameters for the primary workflow stage and the one or more secondary workflow stages concurrently. Examples of the set of parameters may comprise at least one of an operational delay, a sequential delay, a routing delay, a re-entrant flow delay, and a quality assessment delay. Accordingly, the planning and scheduling server 102 may be configured to control and execute the set of operations in the workflow unit for the plurality of product items on the basis of the global workflow sequence. For example, the planning and scheduling server 102 may concurrently determine a first workflow sequence for a paint workflow stage and generate a second workflow sequence for a body workflow stage in an auto assembly line. The first workflow sequence may correspond to operations, such as body cleaning operation, a pre-coating operation, a coating operation, a baking operation, and the like. The second workflow sequence may correspond to operations, such as a machining operation, a welding operation, a fitting operation, a testing operation, and the like.

In accordance with an embodiment, the planning and scheduling server 102 may transmit the determined global workflow sequence to the operations server 106. The operations server 106 may control execution of each scheduled operation in the workflow unit in real time based on the received global workflow sequence. The set of operations may be executed to maximize a performance score of the set of operations on the plurality of product items. The performance score may be maximized based on the managed set of parameters associated with the set of operations on the plurality of product items. In other words, the planning and scheduling server 102, in conjunction with the operations server 106, guides the workflow unit, for example a manufacturing unit, to decide what, where, and when to manufacture the plurality of product items in a most optimal manner.

In accordance with an embodiment, at a plurality of pay-points, the planning and scheduling server 102 may be configured to monitor the set of operations that may be executed based on the global workflow sequence. In accordance with an embodiment, the monitoring server 108 may be configured to monitor the set of operations that may be executed based on the global workflow sequence at each of the plurality of pay-points. Each pay-point may correspond to a checkpoint in the VFL for measurement of entry and exit time of each product item. The measurement may be correlated with time based monetary or financial constraints for each product item of the plurality of product items. The monitoring server 108 may be further configured to ascertain a deviation, measured in time delays or sequence positions, from the established execution time or sequence for the set of operations. Additionally, the monitoring server 108 may be configured to monitor a number of violations of the set of constraints in the real time. The number of violations may be recorded as a violation metric for determination of the execution sequence. Additionally, the monitoring server 108 may determine a performance score for the set of operations executed in accordance with the global workflow sequence.

In accordance with an embodiment, the planning and scheduling server 102 may be configured to share the generated global workflow sequence to a plurality of external systems, such as suppliers, in a supply chain. With reference to the above example, the manufacturing unit may go through a procurement process, and based on the global workflow sequence, the suppliers may determine supply schedules accordingly. In other words, the suppliers may exactly determine what and when to supply material to the workflow unit, based on which the workflow unit may be able to operate upon the plurality of product items.

Figure 2:
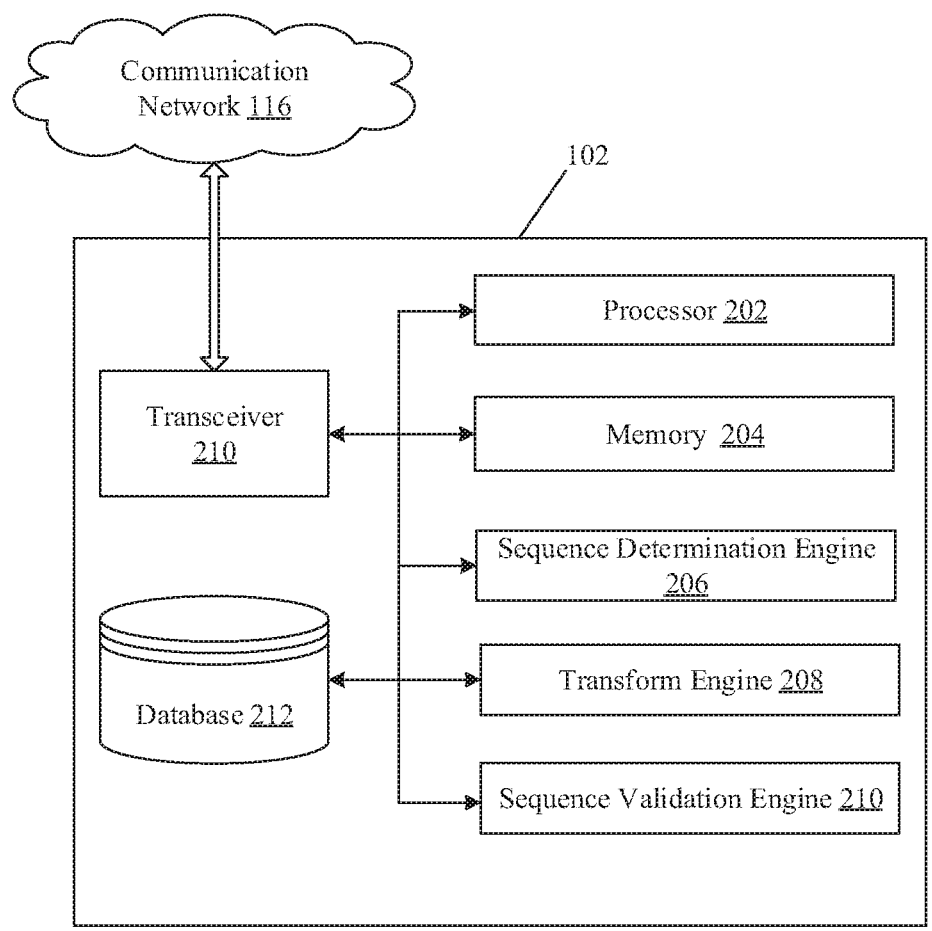
FIG. 2 is a block diagram that illustrates an exemplary planning and scheduling server for generation of a global workflow sequence for multiple workflow stages in an industrial environment, in accordance with various exemplary embodiments of the present disclosure.

FIG. 2 is a block diagram that illustrates an exemplary planning and scheduling server for generation of a global workflow sequence for multiple workflow stages in an exemplary industrial environment, in accordance with various embodiments of the present disclosure. FIG. 2 has been explained in conjunction with FIG. 1. With reference to FIG. 2, there is shown the planning and scheduling server 102 that may include a processor 202, a memory 204, a sequence determination engine 206, a transform engine 208, a sequence validation engine 210, and a database 212. Additionally, the planning and scheduling server 102 may include a transceiver 214, that may correspond to a network communication port, for transmission and reception of the communication data with the at least one or more computing devices. Specifically, the at least one or more computing devices may include the order assessment server 104, the operations server 106, the monitoring server 108, the data server 110, and the client device 118. The one or more computing devices may be communicatively coupled to the planning and scheduling server 102, via the communication network 116.

The processor 202 may comprise suitable logic, circuitry, and interfaces that may be configured to execute a set of instructions stored in the memory 204. The set of instructions may be executed in the processor 202 via communication from at least one of the sequence determination engine 206, the transform engine 208, and the sequence validation engine 210. Additionally, the processor 202 may execute a set of instructions communicated via authorized third party or peripheral client devices, such as the client device 118 (FIG. 1). Each set of instructions may correspond to at least one of an arithmetical, logical or graphical computing task. Examples of the task may include, but are not limited to, a transform calculation task, a sorting task, a sequencing task, a clustering task, a collation task, a routing task, an authentication or authorization task, a validation task, and a sequence generation task. Examples of the processor 202 may be an Application-Specific Integrated Circuit (ASIC) processor, a Complex Instruction Set Computing (CISC) processor, and/or other control circuits.

The memory 204 may comprise suitable logic, circuitry, and interfaces that may be configured to store the set of instructions executable by the processor 202. The memory 204 may be configured to store instructional data related to various computational techniques, which may include, but are not limited to, stochastic optimization technique, simulated annealing technique, evolutionary technique, ant colony optimization technique, and particle swarm optimization technique. Such computational techniques may be executed by other processing units, such as the processor 202, the sequence determination engine 206, the transform engine 208, and the sequence validation engine 210 to obtain the global workflow sequence for the workflow unit. The memory 204 may be further configured to store operating systems and associated application programs to implement the computational techniques. Examples of implementation of the memory 204 may include, but are not limited to, Read Only Memory (ROM), Random Access Memory (RAM), Dynamic Random Access Memory (DRAM), Static Random Access Memory (SRAM), Thyristor Random Access Memory (T-RAM), Zero-Capacitor Random Access Memory (Z-RAM), cache memory, volatile memory, a flash memory, Hard Disk Drive (HDD), a Solid-State Drive (SSD), and/or a removable media drive.

The sequence determination engine 206 may be a special-purpose hardware processor that may comprise suitable logic, circuitry, and interfaces that may be configured to determine the global workflow sequence for the workflow unit. The global workflow sequence may include a first workflow sequence, associated with a first set of constraints, for a primary workflow stage of the workflow unit. The global workflow sequence may further include concurrently generated one or more second workflow sequences based on transformation of the first workflow sequence. The transformation of the first workflow sequence may be performed in accordance with one or more second set of constraints. Each constraint in the first set of constraints and the one or more second set of constraints may affect the transformation of the primary sequence. One or more constraints in the first set of constraints or the one or more second set of constraints may be interdependent on other constraint(s) in the first set of constraints or the one or more second set of constraints. Examples of the sequence determination engine 206 may be a central processing unit (CPU), a graphic processing unit (GPU), a special-purpose application specific integrated circuit (ASIC) processor, a special-purpose complex instruction set computer (CISC) processor, and/or other special-purpose control circuits.

The transform engine 208 may be a special-purpose hardware processor that may comprise suitable logic, circuitry, and interfaces that may be configured to apply transformations on the determined first workflow sequence for concurrent generation of the one or more second workflow sequences. The transform engine 208 may be configured to capture a plurality of dependencies in the plurality of workflow sequences across the plurality of workflow stages in a workflow unit as extended lead times or variable process times. The transformation of the determined first workflow sequence to the one or more secondary workflow sequences may correspond to a parallel transformation or a multi-threaded transformation. The transform engine 208 may utilize a set of transformation techniques, which may be retrieved from the memory 204 and/or the database 212 of the planning and scheduling server 102, for the transformation of the determined first workflow sequence to the one or more secondary workflow sequences. Examples of the transformation techniques may include, but are not limited to, matrix multiplication, addition, subtraction and inversion, reference to one or more correspondence charts, matrix shifting, and sorting. Additionally, each transformation technique may be associated with a set of arithmetical or logical computations of one or more sequence parameters. Examples of the one or more sequence parameters may include, but are not limited to, a sequential displacement factor, an engineering change boundary (ECB), a slot identifier, a lot identifier, an extended lead time, a variable process time, and a priority factor. Further, the transform engine 208 may apply the selected transformation technique in one or more passes to prevent violation of the one or more constraints that share interdependencies. Examples of such constraints are precedence relations between operations, or sequence patterns. Examples of the transform engine 208 may be a CPU, a GPU, a special-purpose ASIC processor, a special-purpose CISC processor, and/or other special-purpose control circuits.

The sequence validation engine 210 may be a special-purpose hardware processor that may comprise suitable logic, circuitry, and interfaces that may be configured to generate a new first workflow sequence from the determined first workflow sequence. The sequence validation engine 210, in conjunction with the sequence determination engine 206 and the transform engine 208, may be configured to transform the new first workflow sequence into one or more new second workflow sequences. The sequence validation engine 210 may be further configured to accept or reject the generated new first workflow sequence and the one or more new second workflow sequences, in accordance with defined acceptance criteria. Examples of the defined acceptance criteria may include, but are not limited to, a penalty test, a fitness score, a threshold test, and a simulated annealing test. Examples of the sequence validation engine 210 may be a special-purpose ASIC processor, a special-purpose CISC processor, and/or other special-purpose control circuits.

The database 212 may comprise suitable logic, circuitry, and interfaces that may be configured to store data associated with the plurality of orders, the set of operations, and operations and schedule data from the at least one or more computing devices. The order data may include, but is not limited to, purchase request, billing information, product category, product class, price, order delivery and processing time, and priority data for the registered orders. Further, the operations and schedule data may include, but is not limited to, operation identifiers, sequence identifiers, product identifiers, correspondence tables, charts, visualizations, operational timestamps, delay durations, and deviations and progress charts. The database 212 may be associated with a database management system. The database management system for the database 212 may be a relational database management system or a non-relational database management system. The relational database management system may define a relational or a structured schema (for example Structured Query Language (SQL)) for the database 212. Alternatively, the non-relational database management system may define a non-relational or an unstructured schema (for example Non SQL (NoSQL)) for storage of the order data, operations data, and schedule data.

The transceiver 214 may comprise suitable logic, circuitry, and interfaces that may be configured to communicate with various computing devices, via the communication network 116. The transceiver 214 may be implemented by use of known technologies to support wired or wireless communication of the planning and scheduling server 102 with the communication network 116. Components of the transceiver 214 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, the processor 202 may be configured to receive a request for determination of a global workflow sequence from an I/O device, such as a keyboard or a touch screen, associated with the planning and scheduling server 102. Subsequently, the transceiver 214 may be configured to receive assessed plurality of orders for a plurality of product items from the order assessment server 104 (FIG. 1), via the communication network 116, for order fulfillment. Alternatively, the transceiver 214 may be configured to retrieve the assessed plurality of orders from the order database 112 (FIG. 1), via the communication network 116. The transceiver 214 may be configured to communicate the assessed plurality of orders to the processor 202.

The processor 202 may be configured to perform planning, such as determination of the location and time, to operate upon the plurality of product items, in accordance with a job of the workflow unit, such as manufacturing unit. In accordance with an embodiment, various instances of the workflow unit may be located at geographically different areas. Accordingly, the processor 202 may determine buckets (or bins) to categorize the received plurality of orders and communicate the determined buckets (or bins) to the sequence determination engine 206.

The sequence determination engine 206 may be configured to determine the first workflow sequence in accordance with a first set of constraints associated with the primary workflow stage of the workflow unit, for example a manufacturing unit. The workflow unit may comprise a plurality of workflow stages, such as a body stage, a paint stage, and a trim stage, managed by the operations server 106. Each of the plurality of workflow stages, arranged in accordance with serial or hybrid FLs, may correspond to a zone. The configuration of workflow stages may comprise a sequential or parallel arrangement of clusters of workflow stages in a VFL that corresponds to, for example physical assembly lines in the manufacturing unit.

Various embodiments of serial and hybrid configurations and types of flows of workflow stages, in accordance with the serial FL (SFL) and the hybrid FL (HFL) are described below. Each of the plurality of workflow stages of a workflow unit may be operatively coupled one or more of the plurality of workflow stages in a configuration defined by a specific VFL configuration of the plurality of workflow stages, as described in detail in FIGS. 4A, 4B, 5A, 5B, and 5C.

Figure 4A:
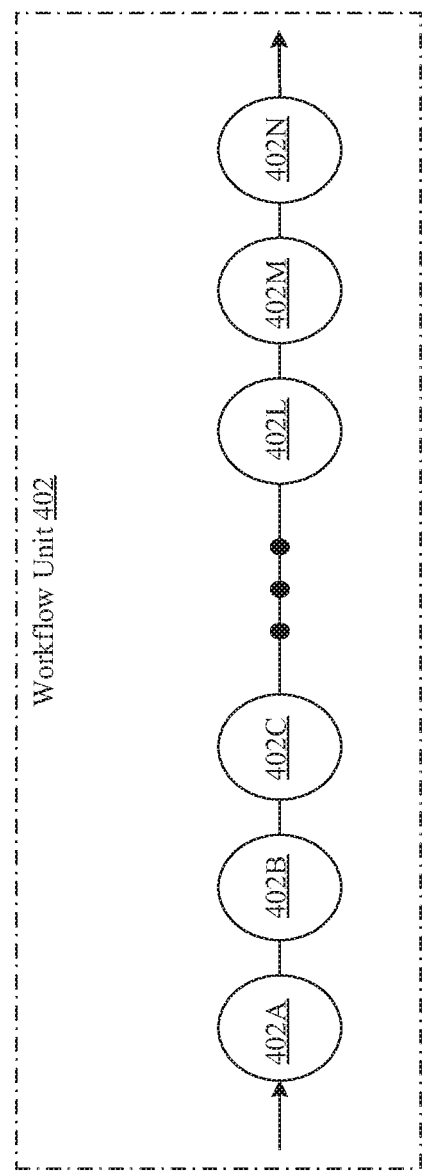
FIG. 4A is a flow diagram illustrating a serial assembly line production being managed by the planning and scheduling server of FIG. 2, in accordance with an embodiment of the present disclosure.

In accordance with an embodiment, the plurality of workflow stages may be configured to operate in the SFL, as described in detail in FIG. 4A. The SFL may correspond to a linear configuration of each workflow stage in the workflow unit of the industrial environment 100. The SFL may not include one or more branches of one or more of the plurality of workflow stages in the industrial environment 100. An output from the one workflow stage may be an input to a next workflow stage of the workflow unit. For example, an auto assembly line may be referred to an SFL in case the trim workflow stage, the body workflow stage, and the paint workflow stage are arranged serially.

Figure 4B:
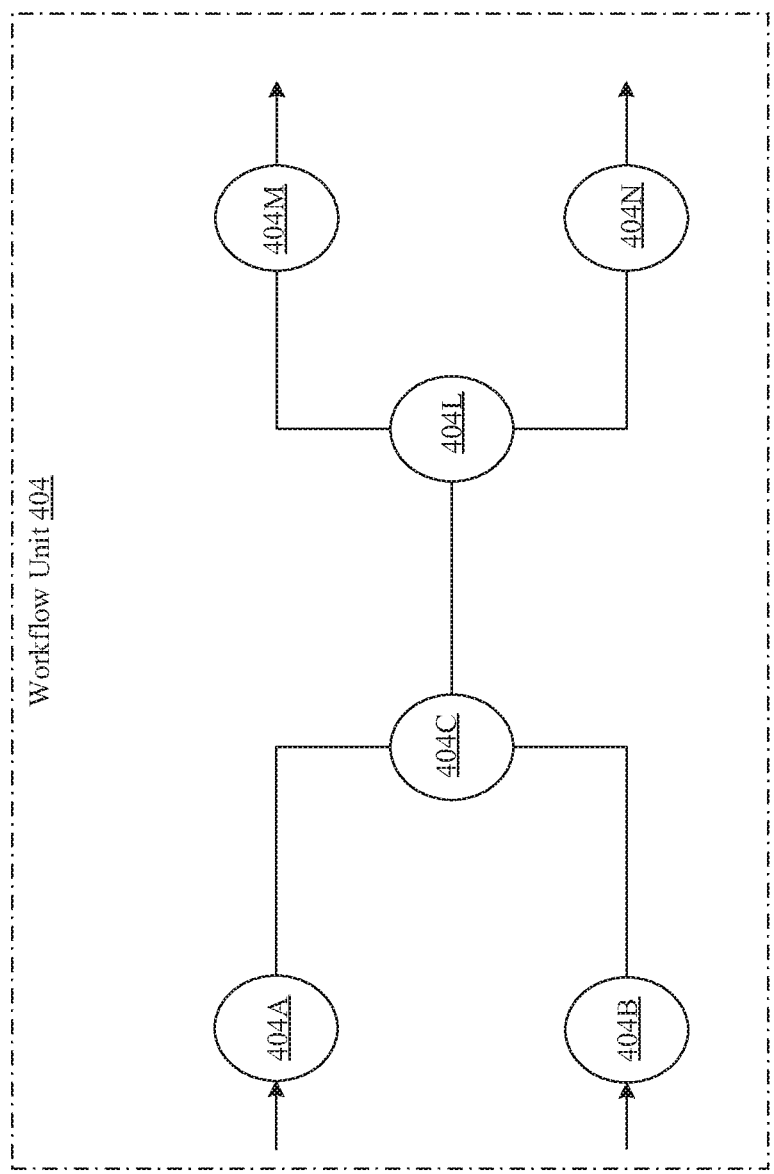
FIG. 4B is a flow diagram illustrating a hybrid assembly line production being managed by the planning and scheduling server of FIG. 2, in accordance with an embodiment of the present disclosure.

In accordance with another embodiment, the plurality of workflow stages may be configured to operate in the HFL, as described in detail in FIG. 4B. The HFL may correspond to at least one of a serial, parallel, or branched network of the plurality of workflow stages of the workflow unit in the industrial environment 100. In accordance with one configuration, output of one workflow stage in the HFL may be connected to an input of at least one or more workflow stages of the workflow unit in the industrial environment 100. In accordance with another configuration, output of multiple workflow stages in the HFL may be connected to an input of subsequent workflow stage of the workflow unit in the industrial environment 100. For example, a chip fabrication facility may be configured to operate in an HFL. Initially, parallel branches of a wafer cutting workflow stage and a die manufacturing workflow stage may be connected to a serial chain of a lithography workflow stage and a chemical cleaning workflow stage. A set of dies and a set of silicon wafers may be fabricated in a parallel fabrication line. The fabricated set of dies and the set of silicon wafers may be collected at the lithography workflow stage for generation of printed circuits in layers of the set of silicon wafers. The printed set of silicon wafers may be chemically cleaned before cutting into individual set of chips. The fabrication of the chips from the wafer cutting workflow stage to the chemical cleaning workflow stage may correspond to the HFL.

In accordance with an embodiment, the FL may be represented graphically as VFL, and may correspond to a serial or hybrid arrangement of the plurality of workflow stages in the workflow unit of the industrial environment 100 in accordance with a set of operational requirements. Each operational requirement may correspond to a constraint for the corresponding order in a corresponding workflow stage of the industrial environment 100. For example, a set of iterative paint operations on a luxury sedan (S) may be an operational requirement as compared to a onetime paint job on a hatchback (T). The operational requirement with iterations may correspond to a re-entrant flow of the luxury sedan (S) compared to a linear flow of the hatchback (T) in the workflow unit. As another example, a luxury car (C) may have to be rerouted to an engineering station for a quality check or engine check. The engineering station may not be a defined workflow stage of the industrial environment 100. The operational requirements of the engineering station may correspond to a partial flow of the product item in the industrial environment 100. The product item that enters a partial flow may return to the FL after fulfillment of the operational requirement.

In accordance with an embodiment, a workflow unit may be configured to operate in one or more workflow configurations. Such workflow configurations may be necessitated by an operational condition, such as oil filling of a test engine, or outsourced operations to a third party unit. Additionally, the set of operations for each product item may affect a workflow configuration for each workflow stage in the workflow unit. For example, an assembly line production of a car (A) may be assigned "2 iterations" in a paint workflow stage, whereas a car (B) may be assigned only one iteration in the paint workflow stage. In other words, the VFL of the car (A) may be a non-linear and re-entrant or looped flow (iterative) whereas the VFL of the car (B) may be a linear and unidirectional flow.

Figure 5A:
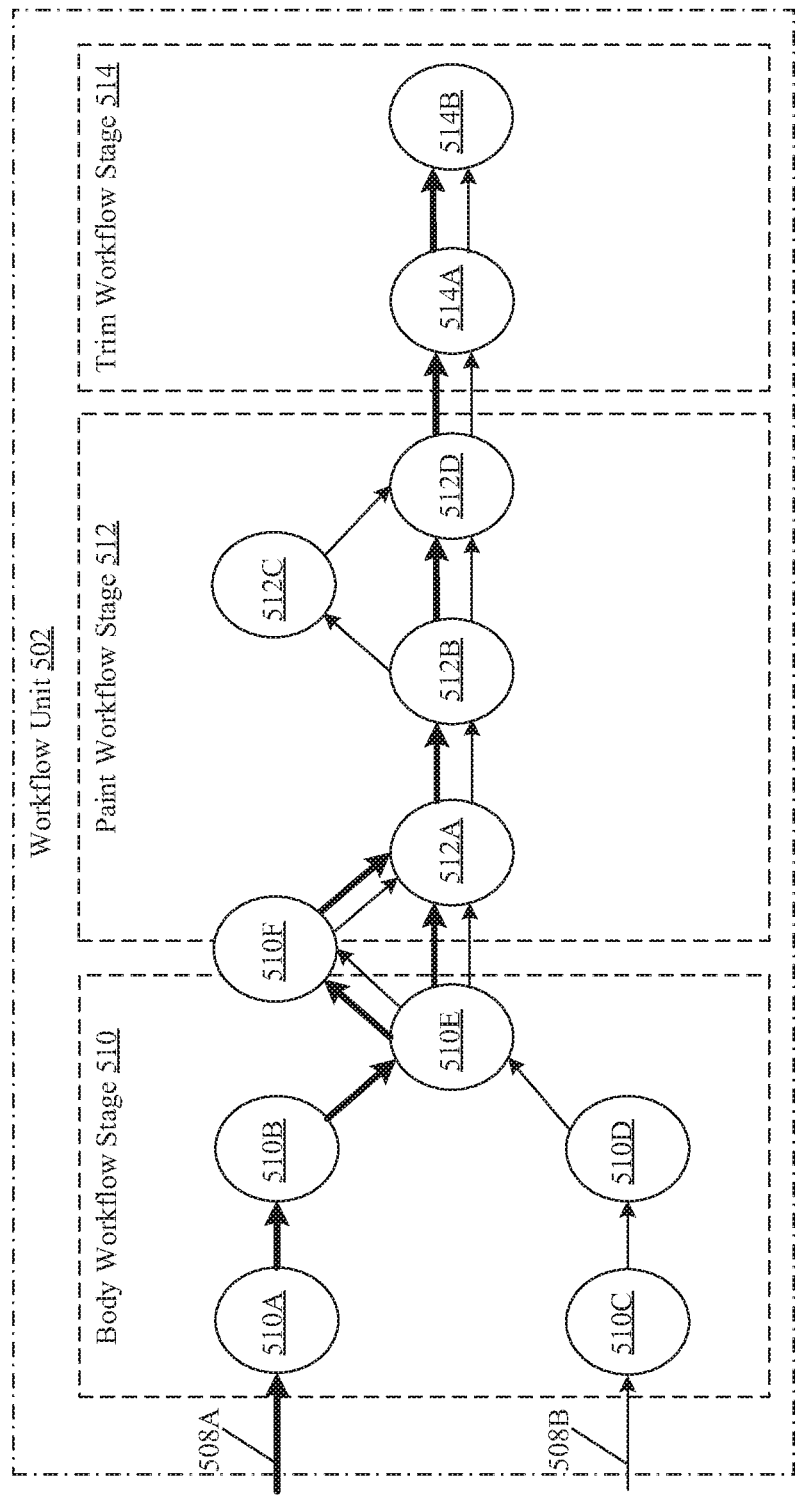
FIG. 5A is a first flow diagram that illustrates an exemplary auto assembly line managed by an exemplary planning and scheduling server, in accordance with an embodiment of the present disclosure.

In accordance with an embodiment, the workflow unit may be configured to operate, in conjunction with addition of one or more extended lead times, at one or more workflow stages in a first workflow configuration, as described in detailed in FIG. 5A. In accordance with another embodiment, the workflow unit may be configured to operate, in conjunction with addition of one or more extended lead times and re-entrant flows at one or more workflow stages, in a second workflow configuration, as described in detail in FIG. 5B. In accordance with yet another embodiment, the workflow unit may be configured to operate, in conjunction with addition of one or more extended lead times and partial flows at one or more stages, in a third workflow configuration, as described in detail in FIG. 5C. In accordance with yet another embodiment, the workflow unit may be configured to operate, with addition of one or more extended lead times, in a configuration which may be a combination of the first, second or third workflow configuration (Not shown).

In some embodiments, the sequence determination engine 206 may determine the primary workflow stage on the basis of an input received from the client device 118. In accordance with other embodiments, the sequence determination engine 206 may determine the primary workflow stage on the basis of a defined policy. The defined policy may be associated with an operational necessity or may be associated with a business process. As an example, a chip fab for fabrication of an integrated circuit may comprise a photolithography workflow stage, an etching workflow stage, a cleaning workflow stage, a doping workflow stage, and a dicing workflow stage in a sequential order. A primary rule may necessitate selection of the initial fab stage, that is, the photolithography stage, as the primary workflow stage. The sequence determination engine 206 may designate the remaining workflow stages as one or more secondary workflow stages. As another example, a manufacturer may select a last workflow stage (or "offline") as the primary workflow stage based on factors, such as relevancy of logistics, dealers and customers. Alternately, the manufacturer may select a first workflow stage as the primary workflow stage based on a decision taken from a plant execution perspective. Such selections may be provided by the manufacturer to the sequence determination engine 206. Each workflow unit may further be associated a set of operations that may be controlled by the processor 202 or an external computing device, such as the operations server 106. The set of operations may correspond to the application area of the workflow unit.

Further, each workflow unit, primary or the one or more secondary workflow stages, may be associated with a set of constraints. Each constraint may define an operational, sequential, or a workflow stage-based condition for each workflow stage of the industrial environment 100. The conditions may be restrictive in accordance with the operational or sequential flow of the order of each product item in the industrial environment 100. Examples of the constraints may include, but are not limited to, a cap on number of body parts of an automobile of same color to be assembled consecutively in an auto assembly line, a necessary step of cleaning surface of a silicon wafer prior to slicing in a fabrication line, and a cap on refill of different paint colors consecutively in an auto assembly line. Additionally, one or more constraints in the set of constraints for each workflow stage of the industrial environment 100 may be interdependent on each other. The interdependency may correlate to a change in operation or workflow sequence of a workflow stage with violation of a constraint of another workflow stage of the industrial environment 100.

For example, an auto assembly line may have a primary workflow stage for trim shop, a first secondary workflow stage for a body shop and a second secondary workflow stage for a paint shop. A constraint in the paint shop may be to batch as many units of the same color as possible, to maximize efficiency and minimize material waste. A constraint in the body shop may be not to have identical units back to back, for example, two glass roofs cannot be back to back due to a limitation of manpower. Such constraints can be inter-dependent and may cause conflict, for example, paint wants identical units back to back whereas body wants dis-similar units back to back. Unless both constraints are considered during generation of the global work sequence, there can be inefficiencies and wasted material in the paint shop, and requirements for additional manpower in body.

The sequence determination engine 206 may execute a set of instructions in the processor 202 for determination of the first workflow sequence and the second workflow sequence for the plurality of workflow stages of the industrial environment 100. Each workflow stage in the industrial environment 100 may be associated with a set of operations and a set of positions in the VFL. Each operation in the set of operations may be identified by an operational identifier and each position in the set of positions may be identified by a positional identifier. The operational identifier may be referred to as a lot number and the positional identifier may be referred to as a slot number. Hereinafter, the slot number and the lot number may be referred to as a slot and a lot, respectively.

The sequence determination engine 206 may further determine the first workflow sequence for the primary workflow stage. The first workflow sequence may correspond to a set of operations for the plurality of product items. A criterion is utilized for determination of the first workflow sequence. The first workflow sequence is in accordance with a first set of constraints of the primary workflow stage. In accordance with an embodiment, the first workflow sequence for the primary workflow stage of the workflow unit may be retrieved from a pre-stored file in a persistent or non-persistent storage. The persistent or non-persistent storage may be associated with the database 212 and the first workflow sequence may be retrieved from records present in the database 212. In accordance with another embodiment, the first workflow sequence may be generated dynamically for the primary workflow stage. The generation of the first workflow sequence may be based on one or more computational techniques, such as a meta-heuristic technique. Further example of the one or more computational techniques may include, but are not limited to, greedy heuristics, Linear Programming (LP) optimization/(Interior Point (IP) methods, stochastic optimization, simulated annealing, evolutionary algorithm, ant colony optimization, and particle swarm optimization. Such application of the computational techniques may be done based some of (a subset) of the set of constraints defined for different workflow stages of the workflow unit.

The first workflow sequence may correspond to a plurality of primary slots. Each primary slot of the plurality of primary slots may indicate a physical location of a component of a product item or an in-operation product item in the primary workflow stage. Additionally, the first workflow sequence further corresponds to a primary lot which is described by a set of features of the operation to be performed in the primary workflow stage. In a similar manner, each of the one or more second workflow sequences may correspond to a plurality of secondary slots where each second slot may indicate a component of the product item or an in-operation product item in one of the one or more secondary workflow stages. Additionally, each of the one or more second workflow sequences may correspond to a secondary lot which may indicate an operation to be performed on the component or in-operation product item in the corresponding secondary workflow stage.

In accordance with an embodiment, the transform engine 208 may be configured to generate the one or more second workflow sequences for the one or more secondary workflow stages concurrently with the determination of the primary workflow sequence. The generation of the one or more second workflow sequences may be based on a transformation of the first workflow sequence. The generated one or more second workflow sequences are in accordance with corresponding one or more second set of constraints associated with the one or more secondary workflow stages. The transformation of the determined first workflow sequence to the one or more second workflow sequences capture the interdependencies amongst the first workflow sequence and the one or more second workflow sequences.

In accordance with an embodiment, the transform engine 208 may suitably apply transformation on the first workflow sequence of the primary workflow stage to evaluate corresponding workflow sequence for each secondary workflow stage. The evaluation of the transformation on the first workflow sequence may be required for an optimal and balanced generation of the one or more second workflow sequences in accordance with a minimum violation of the one or more interdependent constraints. The transformation of the determined first workflow sequence to the one or more second workflow sequences may be performed concurrently based on at least one of a parallelized or a multi-threaded transformation process. For example, the transform engine 208 may allocate a single thread to each instance of the transform engine 208 in the memory 204. Each thread may be selected from a plurality of threads in the thread pool. The number of threads in the thread pool may be defined from a specification of the processor 202. Each instance of the transform engine 208 may correspond to a set of instructions in the memory 204 for evaluation of each second workflow sequence corresponding to each secondary workflow stage of the industrial environment 100. The transform engine 208 may utilize an optimal thread allocation technique for allocation of serial or hybrid combination of threads to one or more of instances of the transform engine 208 in the memory 204. The parallel or hybrid combination may enable concurrent transformation of the one or more second workflow sequences for the one or more secondary workflow stages.

The transformation of the first workflow sequence may be performed in a number of steps. Each step may be associated with an arithmetical or logical rule. The transform engine 208 may utilize a transformation technique which may be selected from a set of transformation techniques. The set of transformation techniques may be stored as the set of instructions in the database 212. Each transformation technique may comprise a set of logical or arithmetical sub-techniques which may be supported by at least one of one or more correspondence tables. Additionally, each of the set of transformation techniques may be characterized as a technique to optimally determine a solution for an optimization problem, such as the determination of the global workflow sequence. Example of the transformation techniques may include, but are not limited to, matrix multiplications, list permutations and table mappings.

In accordance with an embodiment, the transformation on the first workflow sequence may be evaluated based on a mapping of each primary lot and each primary slot in the first workflow sequence with corresponding secondary lot and secondary slot in accordance with a first correspondence table. The first correspondence table may correspond to a timing correspondence table (TCT). The TCT may be a data structure that maps each of the plurality of secondary slots in each of the one or more secondary workflow stages onto a corresponding primary slot of the plurality of primary slots in the primary workflow stage. In other words, the TCT may correspond to tabular map of the plurality of secondary slots and the plurality of primary slots in absence of a sequential displacement.

A sequential displacement may be considered for evaluation of the transformation on the first workflow sequence of the primary workflow stage. In general, the sequential displacement of a lot may correspond to a time consumed for a product item in excess of the planned and scheduled duration of other lots in the workflow sequence. In other words, for every delay accounted in excess of a time duration defined for an assigned lot, a corresponding sequential displacement may be rendered for associated component or whole of the product item.

In accordance with an embodiment, the transformation may be evaluated in for net zero sequential displacement. For example, an auto assembly line may include a primary workflow stage of a trim shop, a first secondary workflow stage of a body shop and a second secondary workflow stage of a paint shop. The primary workflow stage may include "10 slots" and associated lots, the first secondary workflow stage may include "10 slots" and associated lots, and the second secondary workflow stage may include "10 slots" and associated slots. The auto part in each slot of the primary workflow stage, the first secondary workflow stage, and the second secondary workflow stage may consume equal time for corresponding lot which may result in the net zero sequential displacement. In accordance with another embodiment, sequential displacement may be positive or negative for different slots or lots of the primary workflow stage or the one or more secondary workflow stages which may result in a net non-zero sequential displacement (pull ahead or pull back) or a net zero sequential displacement. The sequential displacement may be a positive value (often referred to as a pull ahead) when the primary workflow stage is placed at the end of correspondence table(s). Similarly, the sequential displacement may be a negative value (often referred to as a push back) when the primary workflow stage is placed at the top of the correspondence table(s). Such placements may be referred as backward scheduling in case of a pull ahead and forward scheduling in case of a push back. In some implementations, a primary workflow stage may be placed in the middle of the correspondence table(s). In such implementations, the sequential displacement may be a positive value or a negative value.

In some embodiments, when the net sequential displacement is zero or absent, the transform engine 208 may determine the primary slot in the primary workflow stage for each of the plurality of secondary slots in each of the one or more secondary workflow stages. The determination of each primary slot may be based on mapping of each record of the primary slot in the TCT with corresponding record of the secondary slot in the TCT. Additionally, the primary lot for the determined primary slot may be determined by the transform engine 208 based on an analysis of the first workflow sequence for the primary workflow stage. The transform engine 208 may also determine the secondary lot in each of the one or more secondary workflow stages that corresponds to the determined primary lot. Alternatively, when the sequential displacement may be zero, the determined workflow sequence for the primary workflow stage may be equal to the workflow sequence for each second workflow stage of the workflow unit.

In other embodiments, when the net sequential displacement is non-zero, the transform engine 208 may additionally determine a sequential displacement based on a combination of the plurality of secondary lots and the plurality of secondary slots in each of the one or more secondary workflow stages. The transformation on the first workflow sequence may be evaluated based on a mapping of each primary lot and each primary slot in the first workflow sequence with corresponding secondary lot and secondary slot in accordance with a second correspondence table. The second correspondence table may correspond to a routing correspondence table (RCT). The RCT may be a data structure that comprises a mapping of each of the plurality of secondary slots in each of the one or more secondary workflow stages with the corresponding primary slot of the plurality of primary slots in the primary workflow stage in accordance with the sequential displacement applied to the TCT. The sequential displacement may be determined based on at least one of an extended lead time (ELT) or a variable process time (VPT). The ELT or VPT may correspond to timing offsets by which the one or more second workflow sequences are related to the first workflow sequence. Additionally, The ELT may be based on the plurality of slots and lots in the primary workflow stage and the one or more secondary workflow stages. The ELT may be associated with an additional delay in completion of an operation in a lot for corresponding product item in the associated slot with respect to other product items in the plurality of slots of a specific workflow stage. For example, an auto body shop may include a slot number "10" for a luxury sedan "A" and a neighboring slot "11" for a hatchback (B). The luxury sedan (A) and the hatchback (B) may undergo a welding operation. The welding operation on the luxury sedan (A) may be completed in "120 minutes" as compared to "60 minutes" for the hatchback (B). In such a case, the transform engine 208 may calculate an ELT of "60 minutes" based on a difference between the welding times of the two automobiles. The luxury sedan (A) may have a slot number "20" and the hatchback (B) may be associated with a slot number "21" in the paint workflow stage. The paint operation may take "30 minutes" per body. The transform engine 208 may evaluate the net sequential displacement for the luxury sedan (A) as "2", which implies that consecutive paint operations of two hatchbacks may be accommodated.

Additionally, the transform engine 208 may consider the VPT to evaluate the sequential displacement in each workflow stage of the industrial environment 100. With reference to the above example, the paint operation for the hatchback (B) may take "60 minutes" as compared to the norm of "30 minutes" for other units. The VPT of "30 minutes", which is a difference between the paint times of the two automobiles, is utilized for determination of the sequential displacement in the secondary slot of the hatchback (B) in a third secondary workflow stage of a final assembly.

The transform engine 208 may evaluate a net sequential displacement for each lot in each secondary workflow stage of the industrial environment 100. The net sequential displacement may be evaluated based on the evaluated ELT or the VPT. In accordance with an embodiment, the net sequential displacement is subtracted from a current secondary slot of the corresponding secondary workflow stage. The position of the secondary slot may be determined based on the subtraction of the sequential displacement from the current secondary slot.

The secondary slot, after subtraction, may be evaluated for a test of an ECB condition. The ECB condition may be defined as a boundary, ahead of which the sequential displacement is not applicable. The ECB condition may be a boundary condition for segregation of product items based on engineering criteria. Examples of the engineering criteria may include, but are not limited to, product design, and design year and month. The transform engine 208 may check whether the secondary slot number, after subtraction, is less than or greater than the defined ECB. In accordance with an embodiment, the defined ECB is equal to "1". In accordance with another embodiment, the defined ECB is greater than "1". The secondary slot is assigned with a first available slot or a slot available next to the ECB when the secondary slot is less than the defined ECB.

For example, the industrial environment 100 may be scheduled to assemble an auto model (P) and an auto model (Q). The auto model (P) may be associated with "2016" as the design year and the auto model, and the auto model (Q) may be associated with "2017" as the design year. Further, the auto model (P) may have "10 slots" (for example, $S_1$-$S_{10}$) allocated in the TCT table. Similarly, the auto model (Q) may have "10 slots" (for example, $S_{11}$-$S_{20}$) allocated after the auto model (Q) in the TCT table. It may be assumed that the slot ($S_{12}$) is subjected to a non-zero sequential displacement of "5". The transform engine 208 may evaluate the new slot as ($S_{12-5}$) or ($S_7$). However, the new slot ($S_7$) for the auto model (Q) is present with slots for the auto model (P) which may be a violation of the design year ECB. The defined ECB may necessitate for segregation of slots for the auto model (P) with the auto model (Q) on the basis of the design year and may define the defined ECB as "10". The transform engine 208 may compare an index of slot ($S_7$) with the defined ECB. The slot ($S_7$) may be shifted to ($S_{11}$) for the auto model (Q) after evaluation of the slot with respect to the defined ECB.

The generation of the one or more second workflow sequences for one or more secondary workflow stages may be performed in a first pass or a second pass. The inclusion of the first pass or the second pass may facilitate a prioritization of workflow units with ELTs. Each secondary slot with a non-zero sequential displacement may be assigned to a corresponding secondary slot in the first pass. The transform engine 208 may assign the secondary slot with zero sequential displacement to an available secondary slot in the second pass. The assignment of the secondary slot with the zero sequential displacement may be performed without subtraction of the sequential displacement.

In accordance with an embodiment, the sequence validation engine 210 may generate a new first workflow sequence based on the first workflow sequence. The sequence validation engine 210 may generate the new first workflow sequence that corresponds to a candidate first workflow sequence. In accordance with an embodiment, the new first workflow sequence may be generated based on a specified operation, according to which the first workflow sequence is modified based on movement of at least one workflow sequence element in the first workflow sequence.

The sequence validation engine 210 may further generate one or more new second workflow sequences based on the transformation of the generated new first workflow sequence. Accordingly, the sequence validation engine 210 may iteratively generate a candidate global workflow sequence corresponding to each iteration for each of the new first workflow sequence and the one or more new second workflow sequences. Each new first workflow sequence and the corresponding one or more new second workflow sequences may be generated with each iteration of a determined number of iterations. In accordance with an embodiment, the determined number of iterations may be of the order of, for example, "$10^6$". It may be noted that the aforesaid order of iterations is merely for exemplary purposes and should not be construed to limit the scope of the present disclosure.

In some embodiments, the transformation of each iteratively generated new first workflow sequence may be re-calculated for each iteration. Alternatively stated, the transformation of each iteratively generated new first workflow sequence may be re-calculated when the transform is sequence dependent, which may be the case when the sequential displacements are a function of the lots. The transformation of the determined new first workflow sequence is re-calculated for each iteration of the determined number of iterations. Each iteratively re-calculated transformation may be utilized for generation of the one or more new second workflow sequences. The transform engine 208 may re-calculate the transformation for each iteration based on a modification in the generated first workflow sequence. The modification may correspond to at least one of an addition, a subtraction, a multiplication, and a division operation. Additionally, the modifications in each workflow sequence may correspond to a swap in a position of a current slot with other slots. The current slot may be swapped randomly or in accordance to defined rule.

For example, the first workflow sequence for the primary workflow stage may be a first matrix (Z). The sequence validation engine 210 may generate a second matrix (Z') for a first iteration. The second matrix (Z') may be a matrix obtained from multiplication of a modifier matrix (A) with the first matrix (Z). The second matrix (Z') may correspond to the new first workflow sequence for the primary workflow stage. Further, the transform engine 208 may calculate the transformation on the second matrix (Z') for generation of a set of matrices ($Z_1$ to $Z_N$). Each generated matrix in the set of matrices ($Z_1$ to $Z_N$) may correspond to each of the one or more new second workflow sequences. Thus, second matrix (Z') corresponding to the new first workflow sequence and the generated set of matrices ($Z_1$ to $Z_N$) corresponding to the one or more new second workflow sequences may correspond to a candidate workflow sequence for a workflow unit.

In other embodiments, the transformation of each iteratively generated new first workflow sequence may be pre-calculated once. Alternatively stated, the transformation of each iteratively generated new first workflow sequence may be pre-calculated when the transform is independent of the workflow sequence, which may be the case when the sequential displacements are only a function of the slots. The transformation of the determined new first workflow sequence may be pre-calculated once for the determined number of iterations. The pre-calculated transformation may be utilized iteratively for generation of the one or more new second workflow sequences in each iteration of the determined number of iterations. The sequence validation engine 210 may test and validate each candidate workflow sequence that comprises a new workflow sequence for each workflow stage of the industrial environment 100. After validation, the candidate workflow sequence may be accepted as the global workflow sequence. Each candidate workflow sequence may be tested and validated based on the defined acceptance criteria. The defined acceptance criteria may be based on a simulated annealing test for determination of a global optimum candidate workflow sequence. Alternatively, the defined acceptance criteria may be based on a suitable heuristic or meta-heuristic algorithm for each workflow stage of the industrial environment 100, without deviation from the scope of the present disclosure.

In accordance with an embodiment, prior to the acceptance of the candidate workflow sequence as the global workflow sequence, each evaluated candidate workflow sequence corresponding to each workflow stage of the industrial environment 100 may be tested for violations of the set of constraints. Accordingly, the sequence validation engine 210 may obtain a penalty score for each workflow stage of the industrial environment 100. The penalty score may be obtained for a number of violations of the set of constraints. The violations may be represented by a time delay or a specific violation metric may be used for each violation of a constraint of the set of constraints for the corresponding candidate workflow sequence. The penalty score may be obtained based on evaluation of the new first workflow sequence for the primary workflow stage and the one or more new second workflow sequences. The sequence validation engine 210 may determine a net change in the penalty score for each iteratively evaluated candidate workflow sequence. The net change in the penalty score may be evaluated for each workflow stage of the industrial environment 100. A cumulative penalty score may be evaluated collectively for the primary workflow stage and each of the one or more secondary workflow stages of the industrial environment 100. The cumulative penalty score may be evaluated from an aggregate of the net change in the penalty score for each workflow stage of the industrial environment 100.

In accordance with an embodiment, the cumulative penalty score may be tested for the defined acceptance criteria using a heuristic or meta-heuristic technique. Examples of the heuristic or meta-heuristic technique may include, but are not limited to, stochastic optimization, simulated annealing, ant colony optimization, particle swarm optimization, and genetic algorithms. In accordance with an exemplary embodiment, the test may be based on the simulated annealing criteria for validation of the cumulative penalty score corresponding to the candidate workflow sequence for each workflow stage of the industrial environment 100. Further, the sequence validation engine 210 may be configured to accept the new first workflow sequence and the one or more new second workflow sequences. The acceptance of the new first workflow sequence and the one or more new second workflow sequences (as candidate workflow sequences) may be based on the determined cumulative penalty score. In other words, the sequence determination engine may positively or negatively validate each iteratively generated new first workflow sequence and each of the one or more new workflow sequences. The positively validated candidate workflow sequence may be accepted and the negatively validated candidate workflow sequence may be rejected by the sequence validation engine 210.

The accepted new first workflow sequence and the one or more new second workflow sequences may correspond to the global workflow sequence. Accordingly, the sequence validation engine 210 may update the first workflow sequence and the one or more second workflow sequences with the new first workflow sequence and the one or more new second workflow sequences. In some embodiments, the new first workflow sequence and the one or more new second workflow sequences may be updated in the database 212 based on the acceptance of the new first workflow sequence and the one or more new second workflow sequences, as described above. In other embodiments, a workflow sequence generated at every $n^{th}$ iteration (for example, $100^{th}$ or $1000^{th}$ workflow sequence) may be stored in the database 212, to facilitate a recovery of the workflow sequence if servers that manage the database 212 crash in the middle of the computation.

Accordingly, the sequence validation engine 210 may obtain the global workflow sequence for the primary workflow stage and the one or more secondary workflow stages. The global workflow sequence may be obtained based on acceptance of at least the determined first workflow sequence for the primary workflow stage and the generated one or more second workflow sequences for one or more secondary workflow stages of the workflow unit.

In accordance with an embodiment, the obtained global workflow sequence for the primary workflow stage and the one or more secondary workflow stages may correspond to a global schedule for production of the plurality of product items. The global schedule may comprise a plurality of time durations for different jobs in the primary workflow stage and the one or more secondary workflow stages.

The global optimal sequence for the primary workflow stage and the one or more secondary workflow stages may be obtained in accordance with simultaneous generation of global optimal schedule for different workflow stages. Such workflow stages may be a combination of primary workflow stage and the one or more secondary workflow stages that may be organized in arbitrary combinations of serial and parallel arrangement of workflow stages, with each stage associated with a corresponding schedule and constraints. Such constraints may exhibit dependency over schedule or constraints of other workflow stages. Further, the global optimal schedule may represent a sequence based on which the plurality of products may be produced. A dependency across the generated global workflow sequence may be present based on extended lead times (ELTs), pull ahead, push back, multiple passes, re-entrant flows, two tones, partial routes, variable process times (VPTs) for the plurality of products. Each dependency may be represented throughout the optimization process as a series of different transformations.

The global optimal schedule may include a plurality of slots that define a time duration for a specific job or operation on a specific product item at a time. Accordingly, the dependency may be described by a plurality of time windows. Alternatively stated, a time slots assigned to one operation in one workflow stage should be present within a time window of the time slot assigned to another operation in another workflow stage. In some instances, a dependency based on coupled inventories may exist between different workflow stages, for example, one workflow stage outputs a first inventory item while the next workflow stage of production consumes the outputted inventory item. Such dependency continues throughout different sequentially coupled workflow stages of a workflow unit. The one or more second workflow sequences may be dependent on the first workflow sequence based on at least one of an extended lead time, an extended lag time, a pull ahead, a number of flow routes, a re-entrant flow, a partial route, and a variable process time.

In accordance with an embodiment, the sequence validation engine 210 may be configured to operatively provide instructions to operations controllers (such as the operations server 106) to control the set of operations for the plurality of product items based on the obtained global workflow sequence. In accordance with another embodiment, the sequence validation engine 210 may be configured to directly control the set of operations for the plurality of product items based on the obtained global workflow sequence. The set of operations are controlled to maximize a performance score for the controlled set of operations on the plurality of product items. The maximization of the performance score may be further based on a penalty score associated with a violation of at least one of the first set of constraints for the primary workflow stage and the one or more second set of constraints for the one or more secondary workflow stages. Thereafter, the sequence validation engine 210 (or the operatively coupled operations controllers) may be configured to manage a set of parameters for the primary workflow stage and the one or more secondary workflow stages concurrently. The managed set of parameters may include, but are not limited to, at least one of an operational delay, a sequential delay, a routing delay, a re-entrant flow delay, and a quality assessment delay.

The operational delay may be incurred due to the ELT or the VPT for the set of operations of the workflow unit. The sequential delay may correspond to delays in completion of operations due to misfit sequence positions. The routing delay may correspond to additional time delay for each additional routing (sequential displacement). The re-entrant and partial-flow delay may correspond to the delay in movement or transfer of product items iteratively or partially across workflow stages. The quality assessment delay may correspond to addition time incurred for pulling a product item for quality assessment and pushing the product item back in a different slot. It may be noted that the different delays have been described so as to be accounted separately, however, those skilled in the art would appreciate that such different delays may be accounted under ELT or VPT without deviation from the scope of the present disclosure.

Figure 3A:
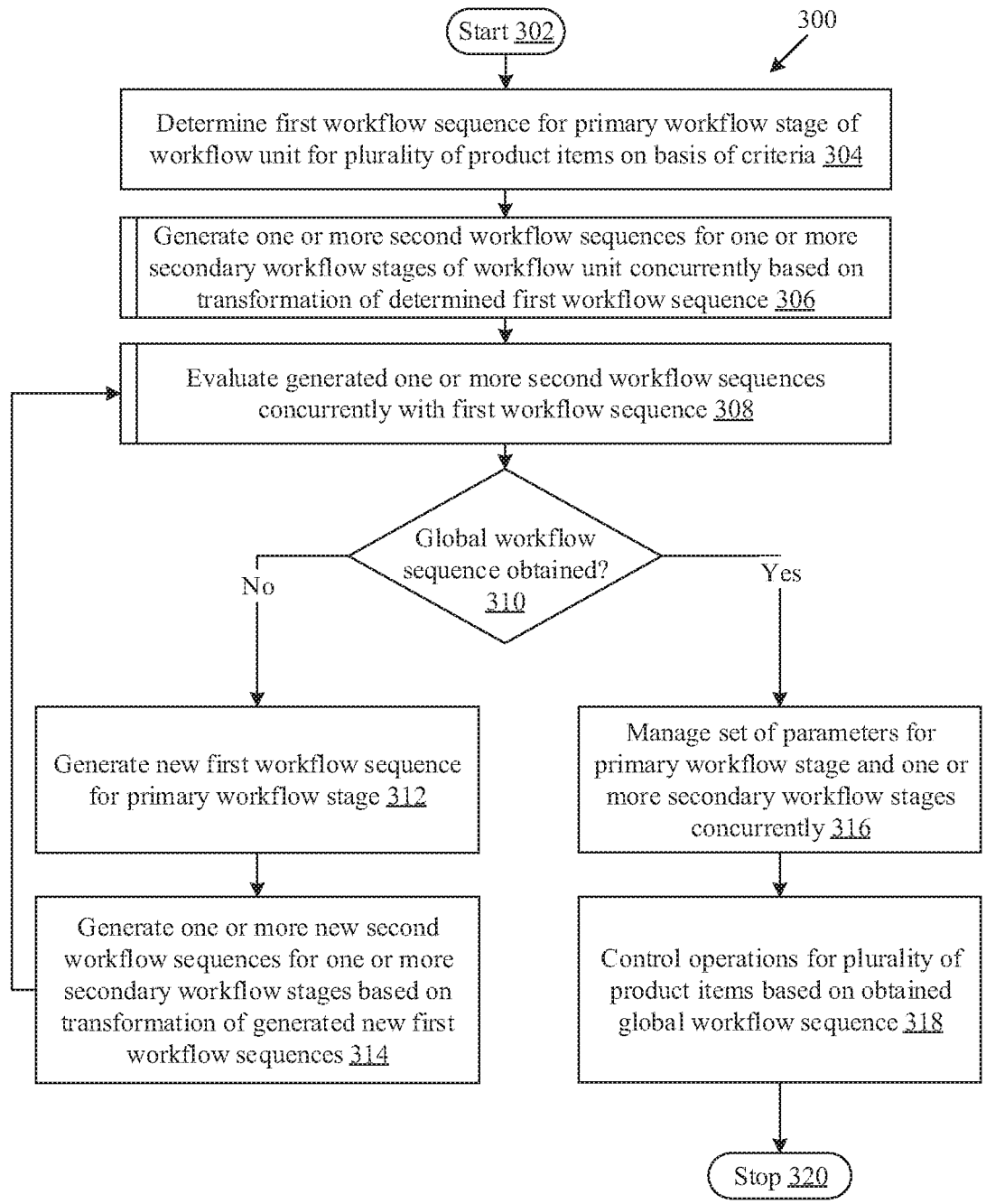
FIG. 3A is a flow chart that illustrates exemplary operations for generation of a global workflow sequence for multiple workflow stages in an industrial environment by an exemplary planning and scheduling server of FIG. 2, in accordance with various exemplary embodiments of the present disclosure.

FIG. 3A is a flow chart that illustrates exemplary operations for generation of a global workflow sequence for multiple workflow stages in an industrial environment, in accordance with various exemplary embodiments of the present disclosure. The exemplary operations may be performed by at least one of a plurality of circuits of the planning and scheduling server 102. FIG. 3A illustrates a flow chart 300 that may be described in conjunction with FIG. 1 and FIG. 2. With reference to FIG. 3A, there is shown the flow chart 300 that comprises exemplary operations from 302 through 320. The exemplary operations for obtaining a global workflow sequence for multiple workflow stages may start at step 302 and proceed to 304.

At step 304, a first workflow sequence is determined for a primary workflow stage of a workflow unit for a plurality of product items. The first workflow sequence is determined on the basis of defined criteria. In accordance with an embodiment, the sequence determination engine 206 may be configured to determine a first workflow sequence for the primary workflow stage of the workflow unit for the plurality of product items. The first workflow sequence may be determined in accordance with a first set of constraints associated with the primary workflow stage of the workflow unit (as described in detail in FIG. 1 and FIG. 2).

At step 306, one or more second workflow sequences may be generated for one or more secondary workflow stages of the workflow unit concurrently with the determination of the first workflow sequence at step 304. The one or more second workflow sequences may be generated based on transformation of the determined first workflow sequence. In accordance with an embodiment, the transform engine 208, operationally in conjunction with the processor 202 and the memory 204, may be configured to generate the one or more second workflow sequences for one or more secondary workflow stages of the workflow unit concurrently. The generated one or more second workflow sequences may be generated in accordance with corresponding one or more second set of constraints associated with the one or more secondary workflow stages of the workflow unit. The first workflow sequence and the one or more second workflow sequences are dependent on one another on the basis of a set of interdependent constraints and operational factors, such as scheduled time, slots and lots, arrangement, FL architecture and the like (as described in detail in FIG. 1 and FIG. 2) and that are captured by transforms.

At step 308, one or more second workflow sequences may be evaluated concurrently with the first workflow sequence. The evaluation of the one or more second workflow sequences may be performed to obtain a global optimum candidate workflow sequence for the workflow unit. In accordance with an embodiment, the sequence validation engine 210 may be configured to evaluate the one or more second workflow sequences concurrently with the first workflow sequence (as described in detail in FIG. 1 and FIG. 2).

At step 310, it is determined whether the candidate global workflow sequence is an optimal global workflow sequence. Alternatively stated, it is determined whether the candidate global workflow sequence provides improves the performance of the workflow unit as compared to previously estimated candidate global workflow sequences. In accordance with an embodiment, the sequence validation engine 210 may be configured to validate the global optimum candidate workflow sequence as the global workflow sequence. The condition may be iteratively evaluated for a positive or negative validation of a candidate workflow sequence (as described in detail in FIG. 1 and FIG. 2). In an instance when the global workflow sequence is obtained, control passes to step 316. The global workflow sequence for the primary workflow stage and the one or more secondary workflow stages is obtained based on at least the determined first workflow sequence for the primary workflow stage and the generated one or more second workflow sequences for one or more secondary workflow stages of the workflow unit (as described in detail in FIG. 1 and FIG. 2). In another instance when the global workflow sequence is not obtained, control passes to step 312.

At step 312, a new first workflow sequence may be generated for the primary workflow stage of the workflow unit. In accordance with an embodiment, the sequence determination engine 206 may be configured to generate the new first workflow sequence for the primary workflow stage of the workflow unit. The generation of the new first workflow sequence may be based on a modification in the determined first workflow sequence for the primary workflow stage of the workflow unit (as described in detail in FIG. 1 and FIG. 2).

At step 314, one or more new second workflow sequences may be generated for the one or more secondary workflow stages of the workflow unit. In accordance with an embodiment, the transform engine 208 may be configured to generate the one or more new second workflow sequences based on the transformation of the generated new first workflow sequence. Control passes back to step 308 (as described in detail in FIG. 1 and FIG. 2).

At step 316, a set of parameters is managed concurrently for the primary workflow stage and the one or more secondary workflow stages of the workflow unit. In accordance with an embodiment, the processor 202 may be configured to manage the set of parameters concurrently for the primary workflow stage and the one or more secondary workflow stages of the workflow unit. The managed set of parameters may comprise at least one of an operational delay, a sequential delay, a routing delay, a re-entrant flow delay, and a quality assessment delay (as described in detail in FIG. 1 and FIG. 2).

At step 318, a set of operations on the plurality of product items may be executed in the order specified by the global workflow sequence for the primary workflow stage and the one or more secondary workflow stages of the workflow unit. In accordance with an embodiment, the processor 202 may be configured to execute the set of operations performed on the plurality of product items on the basis of the obtained global workflow sequence. The set of operations may be executed for maximization of a performance score for the workflow unit (as described in detail in FIG. 1 and FIG. 2). Control passes to end step 320.

Figure 3B:
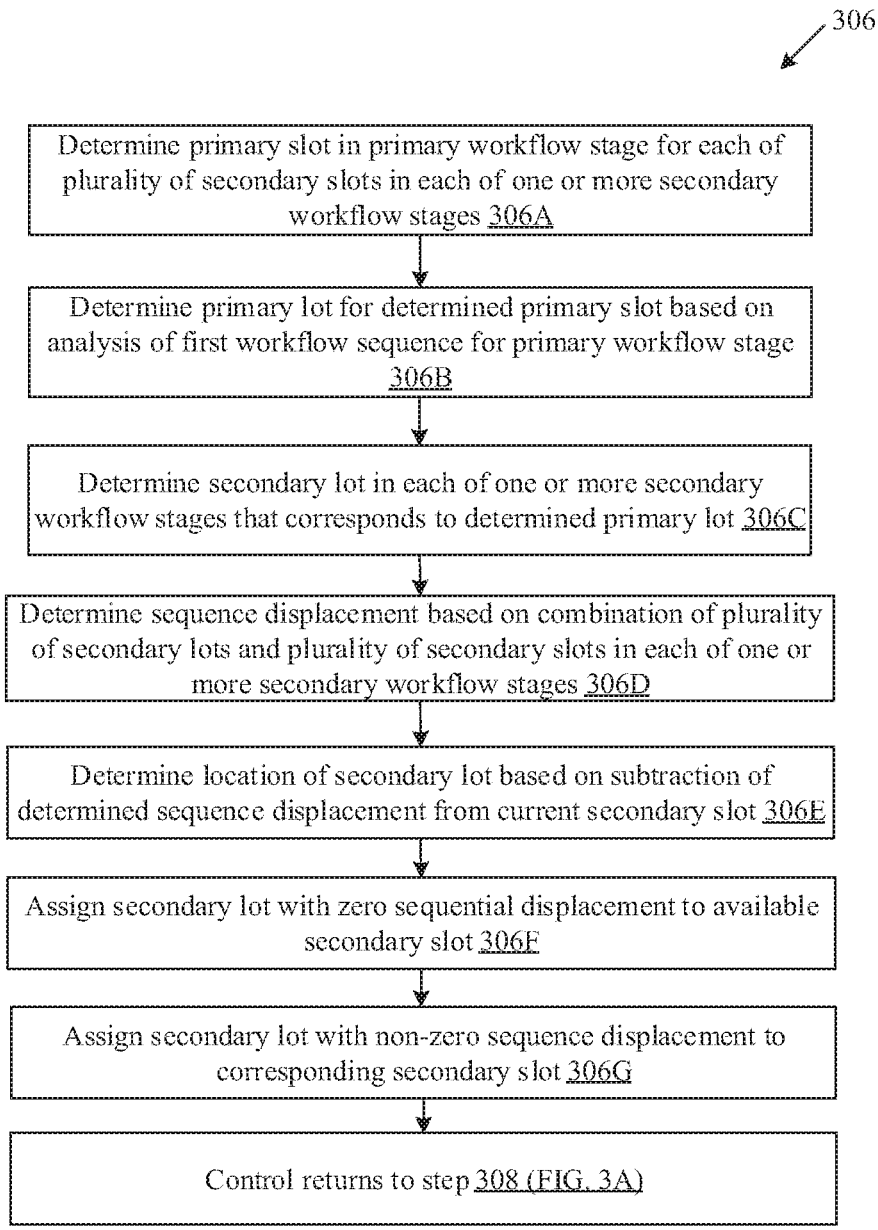
FIG. 3B is a flow chart that illustrates exemplary operations for calculation of transformations from generated workflow sequences for a primary workflow stage in an industrial environment by the planning and scheduling server of FIG. 2, in accordance with various exemplary embodiments of the present disclosure.

FIG. 3B is a flow chart that illustrates exemplary operations for generation of one or more secondary workflow stages of the workflow unit concurrently with the determination of the first workflow sequence, based on transformation of the determined first workflow sequence at step 306 (FIG. 3A), in accordance with an embodiment of the present disclosure. The exemplary operations may be performed by the transform engine 208. With reference to FIG. 3B, the flow chart 306 illustrates sub steps of the step 306 in the flow chart 300 of FIG. 3A, and is described in conjunction with FIG. 2 and FIG. 3A. The flow chart 306 comprises exemplary operations from 306A through 306G. The exemplary operations may start from step 306A.

At step 306A, a primary slot in the primary workflow stage may be determined for each secondary slot of the plurality of secondary slots in each of the one or more secondary workflow stages of the workflow unit. In accordance with an embodiment, the transform engine 208 may be configured to determine the primary slot in the primary workflow stage for each secondary slot of the plurality of secondary slots in each of the one or more secondary workflow stages of the workflow unit (as described in detail in FIG. 2).

At step 306B, a primary lot for the primary slot may be determined on the basis of an analysis of the first workflow sequence of the primary workflow stage. In accordance with an embodiment, the transform engine 208 may be configured to determine the primary lot for the determined primary slot on the basis of the analysis of the first workflow sequence of the primary workflow stage. The analysis of the first workflow sequence may correspond to an ordered execution of the set of operations in a scheduled operational timeframe (as described in detail in FIG. 2).

At step 306C, a secondary lot corresponding to the determined primary lot may be determined for each of the one or more secondary workflow stages. In accordance with an embodiment, the transform engine 208 may be configured to determine the secondary lot corresponding to the determined primary lot for each of the one or more secondary workflow stages (as described in detail in FIG. 2).

At step 306D, a net sequential displacement may be determined on the basis of a combination of the plurality of secondary lots and the plurality of secondary slots for each of the one or more secondary workflow stages. In accordance with an embodiment, the transform engine 208 may be configured to determine the sequential displacement on the basis of the combination of the plurality of secondary lots and the plurality of secondary slots for each of the one or more secondary workflow stages. The sequential displacement may correspond to a number by which a current slot of a product item may shift in the secondary sequence. The sequential displacement may be a positive or a negative number. Alternatively, the sequential displacement may be zero (as described in detail in FIG. 2).

At 306E, a location of the secondary lot is determined on the basis of subtraction of the determined net sequential displacement from a current secondary slot of the one or more secondary workflow stages. In accordance with an embodiment, the transform engine 208 may be configured to determine a location of the secondary lot on the basis of subtraction of the determined net sequential displacement from the current secondary slot of the one or more secondary workflow stages. The subtraction operation may be performed using a structured table of timing and routing correspondences, such the TCT table or the RCT table (as described in detail in FIG. 2).

At step 306F, each secondary lot with a zero sequential displacement is assigned to an available secondary slot. In accordance with an embodiment, the transform engine 208 may be configured to assign each secondary lot with the zero sequential displacement to the available secondary slot in the one or more secondary workflow stages. In other words, the transform engine 208 may be configured to assign a record of the secondary lot with the zero sequential displacement to a record for the available secondary slot with in the TCT table (as described in detail in FIG. 2).

At step 306G, each secondary slot with a non-zero sequential displacement is assigned to corresponding secondary slot in the one or more secondary workflow stages. In accordance with an embodiment, the transform engine 208 may be configured to assign each secondary lot with the non-zero sequential displacement to the corresponding secondary slot. In other words, a record of each secondary lot with the non-zero sequential displacement is updated with the corresponding record of the secondary slot in the TCT table (as described in detail in FIG. 2). Control passes to step 308 in FIG. 3A.

Figure 3C:
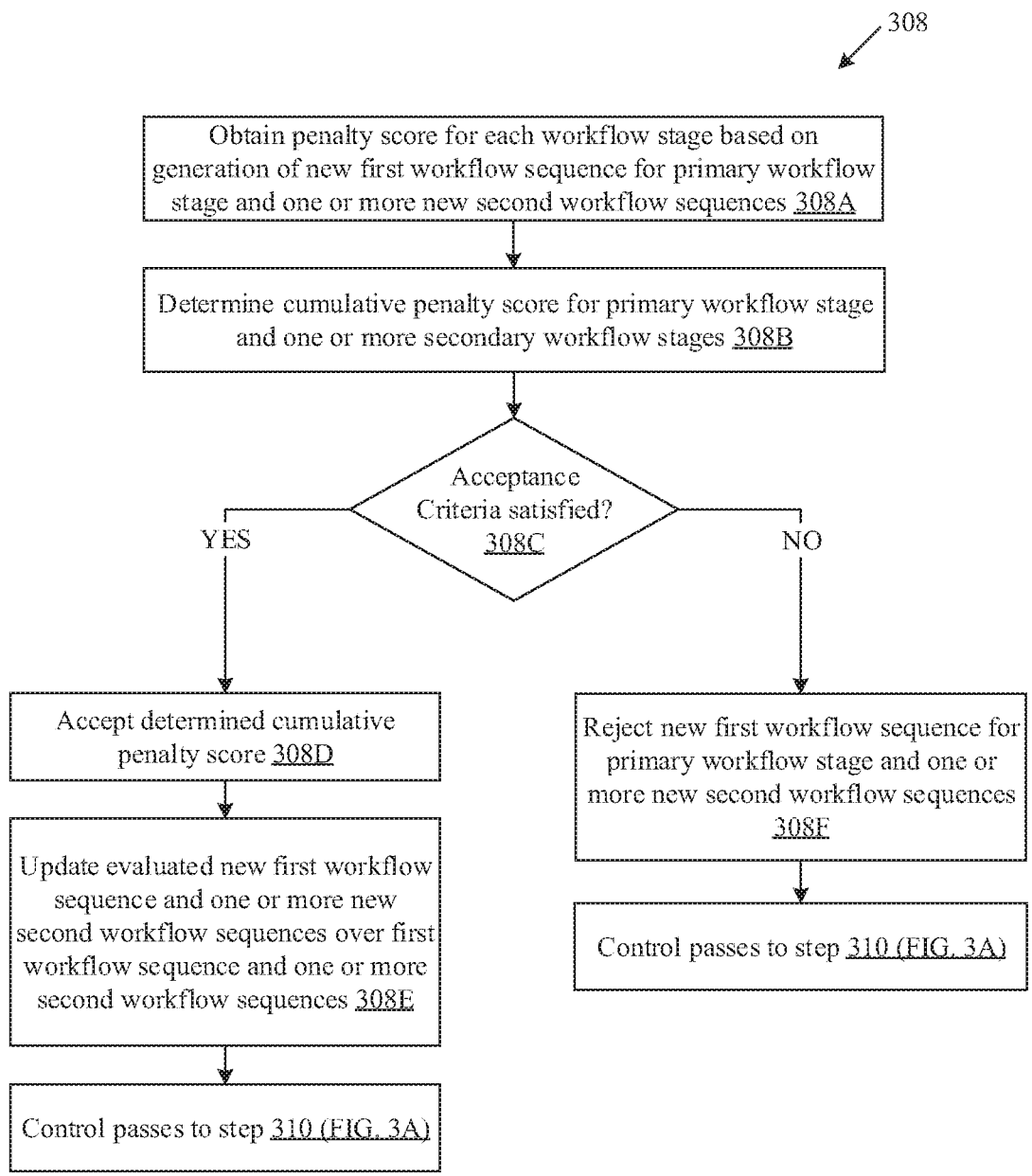
FIG. 3C is a flow chart that illustrates exemplary operations for validation and acceptance of candidate global workflow sequence for workflow stages in the industrial environment by the planning and scheduling server of FIG. 2, in accordance with various exemplary embodiments of the present disclosure.

FIG. 3C is a flowchart that illustrates exemplary operations for evaluation of the one or more second workflow sequences to obtain a global optimum candidate workflow sequence for the workflow unit of the industrial environment at step 308 (FIG. 3A), in accordance with various exemplary embodiments of the present disclosure. The exemplary operations may be performed by the sequence validation engine 210. With reference to FIG. 3C, the flow chart 308 illustrates sub steps of the step 308 in the flow chart 300 of FIG. 3A, and is described in conjunction with FIG. 2 and FIG. 3A. The flow chart 308 comprises exemplary operations from 308A through 308F. The exemplary operations may start from step 308A.

At step 308A, a penalty score is obtained for each workflow stage on the basis of generation of the new first workflow sequence and the one or more new second workflow sequences. In accordance with an embodiment, the sequence validation engine 210 may be configured to obtain the penalty score for each workflow stage of the workflow unit. The penalty score may correspond to violations of constraints in one or more the primary and secondary zones. A minimal penalty score may be preferred for optimum performance and control of the set of operations (as described in detail in FIG. 2).

At step 308B, a cumulative penalty score may be determined for the primary workflow stage and the one or more secondary workflow stages of the workflow unit. In accordance with an embodiment, the sequence validation engine 210 may be configured to determine the cumulative penalty score for the primary workflow stage and the one or more secondary workflow stages of the workflow unit. The cumulative penalty score may provide a measure of performance of the workflow unit corresponding to each new first workflow sequence and the one or more new second workflow sequences (as described in detail in FIG. 2).

At step 308C, it is determined whether a candidate workflow sequence satisfies an acceptance criteria. In accordance with an embodiment, the sequence validation engine 210 may be configured to determine validation of the acceptance criteria by the candidate workflow sequence. The condition may be iteratively evaluated for a positive or negative validation of the candidate workflow sequence. In an instance when the candidate workflow sequence is positively validated for the acceptance criteria (as described in detail in FIG. 2), control passes to step 308D. In another instance when the candidate workflow sequence is negatively validated for the acceptance criteria (as described in detail in FIG. 2), control passes to step 308F.

At 308D, a validation of the determined workflow sequence may be performed. In accordance with an embodiment, the sequence validation engine 210 may be configured to validate the feasibility of the sequence. Such validation may be done on the basis of adherence to all hard constraints or those that must be satisfied for the sequence to be buildable in the factory.

At 308E, an update of the evaluated new first workflow sequence and the one or more new second workflow sequences over the determined first workflow sequence and the one or more second workflow sequences is performed. In accordance with an embodiment, the sequence validation engine 210 may be configured to update the evaluated new first workflow sequence and the one or more new second workflow sequences over the determined first workflow sequence and the one or more second workflow sequences (as described in detail in FIG. 2). Control passes to step 310 in FIG. 3A.

At 308F, a rejection of the new first workflow sequence and the one or more new second workflow sequences may be performed. In accordance with an embodiment, the sequence validation engine 210 may be configured to reject the new first workflow sequence and the one or more new second workflow sequences. The rejection may be based on the negative validation of the cumulative penalty score for the new first workflow sequence and the one or more new second workflow sequences in accordance with the acceptance criteria (as described in detail in FIG. 2). Control passes to step 310 in FIG. 3A.

FIG. 4A is a flow diagram that illustrates an exemplary workflow unit operatively configured in an SFL of workflow stages, in accordance with an embodiment of the present disclosure. FIG. 4A is described in conjunction with the description of FIG. 1 and FIG. 2. With reference to FIG. 4A, there is shown a workflow unit 402 which may be configured to process one or more orders of one or more product items in the industrial environment 100. The workflow unit is managed by the planning and scheduling server 102, in conjunction with the operations server 106, the monitoring server 108, and the data server 110. The workflow unit 402 may comprise one or more workflow stages, such as a milling and machining stages on a glass frame in an exemplary industrial environment 100, such as a glass frame production plant, for staged and sequential application of a set of operations on each product item in an SFL. The workflow unit 402 may comprise a first set of workflow stages 402A . . . 402C and a second set of workflow stages 402L . . . 402N. It may be noted that in FIG. 4A, the workflow unit 402 is composed of the first set of workflow stages 402A . . . 402C and the second set of workflow stages 402L . . . 402N; however, those skilled in the art would appreciate that more workflow stages with more slots may be present in the workflow unit 402, without a deviation from scope of the present disclosure.

The SFL configuration of the workflow unit 402 may be characterized as a serial network configuration of a first set of slots and a second set of slots in each of corresponding first set of workflow stages 402A . . . 402C and second set of workflow stages 402L . . . 402N of the workflow unit 402. In serial network configuration, a product item (or component of a product item) may be operated and moved from a current slot to a serially next slot in the SFL. The sequence associates each slot with a corresponding lot. Each slot and corresponding lot may be associated with a pay-point which is used to monitor KPIs such as adherence to the generated schedule. A delay may be incurred for an additional consumption of time for a specific operation on a product item in a slot. The delay may reciprocate or propagate along the serially connected slots in each of the workflow stages. For example, a glass frame in a second workflow stage 402B may be operated upon by a milling machine or a CNC machine to obtain suitable thickness of a car window. A manufacturing defect in the glass frame may delay the milling or machining operation on the glass frame. Alternatively, to obtain a specific thickness of the car window, the glass frame may be operated for an excess time which may deviate from a specified pay-point and may be accounted as a delay. The delay from operations in the second workflow stage 402B may be propagated to the first workflow stage 402A. The glass frame in the first workflow stage 402A may move to the serially connected second workflow stage 402B after waiting for a timeframe equivalent to the delay incurred for the milling or machining operation on the glass frame in the second workflow stage 402B. The SFL may be implemented for workflow units with significant dependency on movement of product items via each slot and corresponding lot.

FIG. 4B is a flow diagram that illustrates an exemplary workflow unit operatively configured in an HFL of workflow stages, in accordance with an embodiment of the present disclosure. FIG. 4B is described in conjunction with the description of FIG. 1 and FIG. 2. With reference to FIG. 4B, there is shown a workflow unit 404 which may be configured to operate a hybrid network of slots and corresponding lots in a hybrid network of workflow stages.

The workflow unit 404 may comprise a hybrid set of slots in each of a first hybrid set of workflow stages 404A . . . 404C and a second hybrid set of workflow stages 404L . . . N. Each workflow stage in the first hybrid set of workflow stages 404A . . . 404C and the second hybrid set of workflow stages 404L . . . N may form a branched network of serial or parallel combination of slots with corresponding lots. Additionally, an operation, characterized as a lot, may be defined for each slot of the hybrid set of slots. Each slot in each of the first hybrid set of workflow stages and the second hybrid workflow stages may be associated with a specific resource. The specific resource may be an assembly line, a machine, or an operator, such as a device or a user that may be required to produce the product item. The product item may comprise one or more components, each of which may be operated upon in a slot of a hybrid workflow stage, such as a hybrid workflow stage 404C, and serially operated in a slot of the hybrid workflow stage, such as a hybrid workflow stage 404L. Alternatively, a first component of the product item may be operated upon in a hybrid workflow stage 404A and simultaneously, a second component may be operated upon in a hybrid workflow stage 404B.

Each slot may be marked for an actual operational timeframe and a scheduled operational timeframe. At certain points in between slots of the workflow unit 404, one or more pay-points may be marked up for determination of an additional delay in execution of associated operations at preceding slots. The additional delay may be attributed to an ELT or a VPT. The additional delay may be calculated from a difference of the actual operational timeframe and the scheduled operational timeframe. On a timescale, the scheduled operational timeframe for each operation in corresponding slot of the hybrid workflow stage 404A or the hybrid workflow stage 404B may be shared simultaneously by a parallel network of slots. Alternatively, a scheduled operational timeframe may be allocated to each slot in a serial network of slots. The hybrid network of slots may comprise a combination of serial and parallel network of slots where scheduled operational timeframes may be shared, divided or distributed among the first hybrid set of slots and the second hybrid set of slots.

The planning and scheduling server 102 may derive plans and schedules for the workflow unit 404 such that an actual cumulative operational timeframe may not exceed a scheduled cumulative operational timeframe. A pay-point may be marked at defined points of the VFL of the workflow unit 404 to time stamp the actual cumulative operational timeframe for preceding slots. The cumulative scheduled operational timeframe may be determined from summation of corresponding scheduled timeframes for at least one slot in a hybrid workflow stage of a parallel network of hybrid workflow stages. The cumulative scheduled operational timeframe may be calculated as a sum of scheduled timeframe for either one of the hybrid workflow stage 404A or the hybrid workflow stage 404B, a scheduled timeframe for either one of the hybrid workflow stage 404M or the hybrid workflow stage 404N, and scheduled timeframe for the hybrid workflow stage 404C and the hybrid workflow stage 404L.

It may be noted that in FIG. 4B, the workflow unit 404 is composed of six hybrid workflow stages; however, those skilled in the art would appreciate that more workflow stages with more slots may be present in the workflow unit 402, without a deviation from scope of the present disclosure.

It may be further noted that in FIG. 4B, the workflow unit 404 is composed of the first hybrid set of workflow stages 404A . . . 404C and the second hybrid set of workflow stages 404L . . . N in a specific configuration; however, those skilled in the art would appreciate that more workflow stages with more variation in number and configuration complexity may be present in the workflow unit 404, without a deviation from scope of the present disclosure.

FIG. 5A is a first flow diagram that illustrates an exemplary auto assembly line managed by an exemplary planning and scheduling server, in accordance with an embodiment of the present disclosure. With reference to FIG. 5A, there is shown a workflow unit 502 that may be operatively configured as an auto assembly line. The workflow unit 502 is described in an exemplary scenario with presence of ELT workflow stages and applications of one or more ELTs to corresponding slots and lots of the workflow unit.

The workflow unit 502 of the auto assembly line is specifically an HFL which includes two flow lines (such as a flow line 508A and a flow line 508B) and three workflow stages (such as a body workflow stage 510, a paint workflow stage 512 and a trim workflow stage 514). It may be noted that in FIG. 5A, the workflow unit 502 of the auto assembly line comprises three workflow stages; however, those skilled in the art would appreciate that more workflow stages may be present in conjunction with more variants of hybrid or serial network of workflow stages, without a deviation from the score of the present disclosure.

A hybrid network of slots in the HFL may include a body workflow stage 510, a paint workflow stage 512, and a trim workflow stage 514. Further, the body workflow stage 510 may comprise a set of body slots 510A . . . 510F, the paint workflow stage 512 may comprise a set of paint slots 512A . . . 512D, and the trim workflow stage 514 may comprise a set of trim slots 514A and 514B. Each workflow stage may be further associated with a set of unshared constraints or a set of shared constraints. The planning and scheduling server 102 may be configured to monitor, assess and generate workflow sequences in accordance with minimal violations of the set of unshared constraints and the set of shared constraints.

The body workflow stage 510 may comprise the body slot 510B, serially configured to receive a processed component of a product item (A), such as a body part of an auto model (A), from the body slot 510A. Similarly, the body workflow stage 510 may comprise the body slot 510D, serially configured to receive a processed component of a product item (B), such a body part of an auto model (B), from the body slot 510C. The body slot 510A and the body slot 510C may receive corresponding component of the product item (A) and the product item (B) via the flow line 508A and the flow line 508B, respectively. Additionally, each of the body slots 510A and 510B and the body slots 510C and 510D may form a parallel branch of the HFL in the auto assembly line. Each parallel branch may be configured to operate concurrently on received component of product item (A) and product item (B) for a scheduled operational timeframe. The scheduled operational timeframe for each parallel branch may or may not vary in accordance with the ELT or the VPT. The processed product item (A) and the product item (B) from each of the body slots 510A and 510B and the body slots 510C and 510D may be transferred to a body slot 510E in accordance with a flow of an SFL. The parallel FLs corresponding to the flow line 508A and the flow line 508B may merge at the body slot 510E.

The body slot 510F is associated with an ELT workflow stage. The ELT workflow stage may correspond to a workflow stage which may be configured to sequentially pull the product item (A) and the product item (B) from the body slot 510E to a branched body slot 510F for a time duration ($T_{PL1}$), such as "30 minutes", which may be equivalent to corresponding ELT of the product item (A). It may be noted that the product item (A) and the product item (B) may be pulled in the branched body slot 510F to apply a sequential displacement (or pull ahead) to the product item (A) and the product item (B) in accordance with the determined global optimum candidate sequence of accepted workflow sequences. A new slot of the product item (A) or product item (B) may be decided based on a modification to the corresponding slot and lot in the second correspondence table, such as an RCT table. The sequence displaced product item (A) and product item (B) may be transferred serially to the paint slot 512A from the branched body slot 510F after being pulled for the time duration ($T_{PL1}$).

Next, the product item (A) and product item (B) may be serially transferred to the branched paint slot 512C. Each paint slot may correspond to a paint operation, scheduled for an operational timeframe. A pay-point may be enabled to monitor timed flow of product item (A) or product item (B) from each workflow stage of the workflow unit 502. The paint slot 512C may be associated with another ELT workflow stage. The product item (A) (or product item (B)) may be pulled to the branched paint slot 512C from the paint slot 512A for another time ($T_{PL2}$), such as "1 hour". It may be noted that the product item (A) (or the product item (B)) may be pulled in the branched body slot 510F to apply a sequential displacement (or pull ahead) to the product item (A) or the product item (B) in accordance with the determined global optimum candidate sequence of accepted workflow sequences. The sequential displacements may be performed in correspondence to modifications in the second correspondence table, such as an RCT table.

The product item (A) (or product item (B)) may be transferred to the paint slot 512D from either of a paint slot 512B or the branched paint slot 512C based on application of ELT. The product item (A) (or product item (B)) may be serially transferred to the trim slot 514A of the trim workflow stage 514. The product item (A) and product item (B) may be further transferred serially to the trim slot 514B to obtain a processed product item (A) or product item (B) in accordance with minimal violations of constraints and optimal timeframe, and within limits of each pay-point.

Figure 5B:
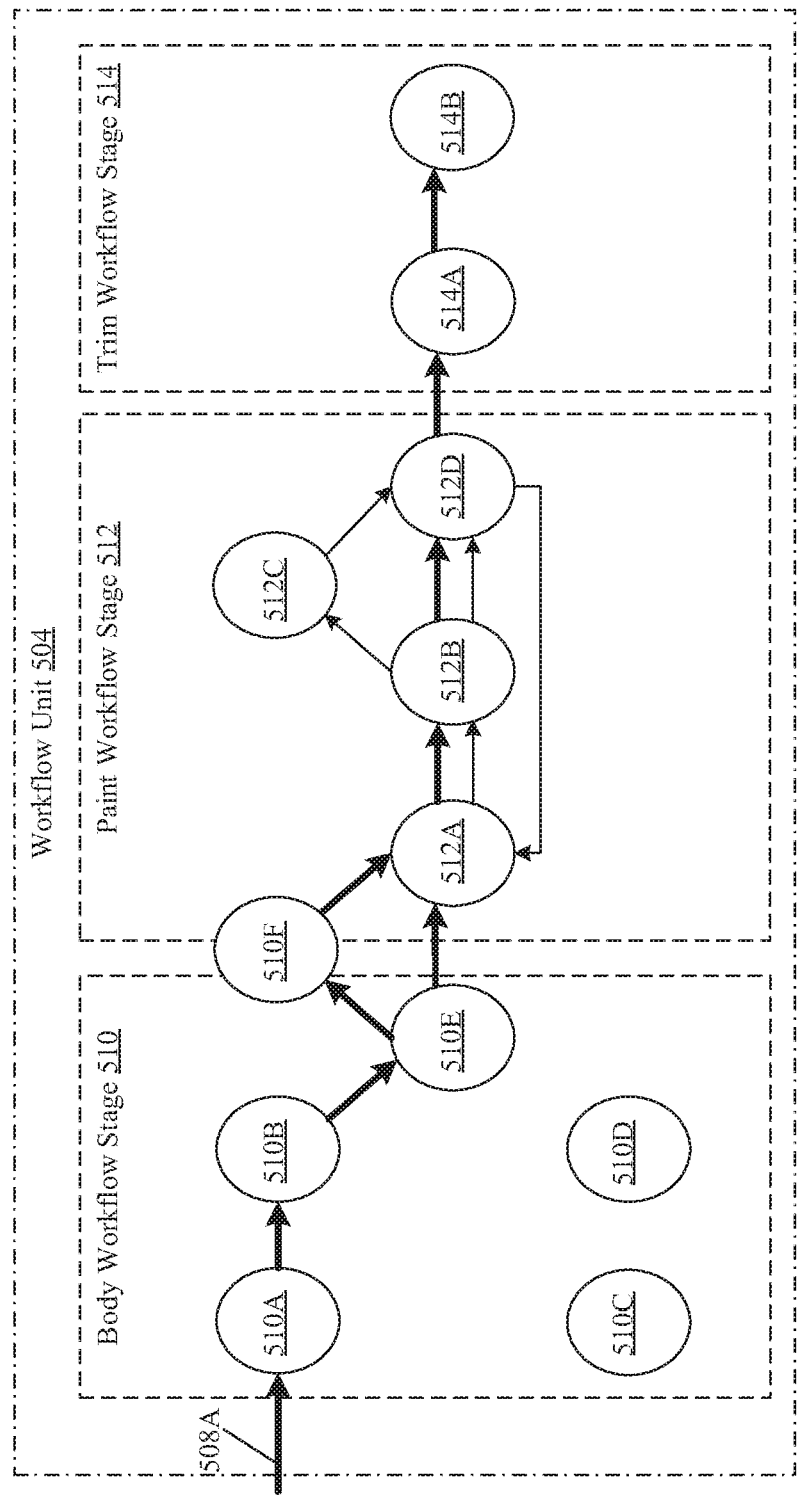
FIG. 5B is a second flow diagram that illustrates an exemplary auto assembly line managed by an exemplary planning and scheduling server, in accordance with an embodiment of the present disclosure.

FIG. 5B is a second flow diagram that illustrates an exemplary auto assembly line managed by an exemplary planning and scheduling server, in accordance with an embodiment of the present disclosure. FIG. 5B is described in conjunction with FIG. 5A. With reference to FIG. 5B, there is shown a workflow unit 504 that may be operatively configured as an auto assembly line. The workflow unit 504 is described in an exemplary scenario with presence of ELT workflow stages and applications of one or more ELTs to corresponding slots and lots of the workflow unit.

With reference to FIG. 5B, the workflow unit 504 may comprise re-entrant or recurrent flows in the HFL of FIG. 5A. The recurrent flow may be present between a pair of slots, such as the paint slot 512B and the paint slot 512A and may correspond to one or more iterative operational loops on the product item (A) or the product item (B) in corresponding paint slot 512B and paint slot 512A. The selection of a product item, from the product item (A) and product item (B), may depend on real time operational requirement of the product item or may be pre-specified for the product item. In an example, a sedan model (A) may require pre-specified iterative loops, for example two iterative loops, of spraying operations for corresponding pre-specified time duration, such as "8 hours", as compared to a one time spraying operation on a hatchback model (B) for corresponding pre-specified time duration, such as "3 hours". The number of iterations may be pre-specified by an operation controller via the client device 118 (FIG. 1) or determined from a database 212 (FIG. 2). A VPT may be calculated for each additional iteration of the sedan model (A) as compared to the hatchback model (B). The VPT may be utilized to modify the transform tables and determine a better global optimal workflow sequence.

Figure 5C:
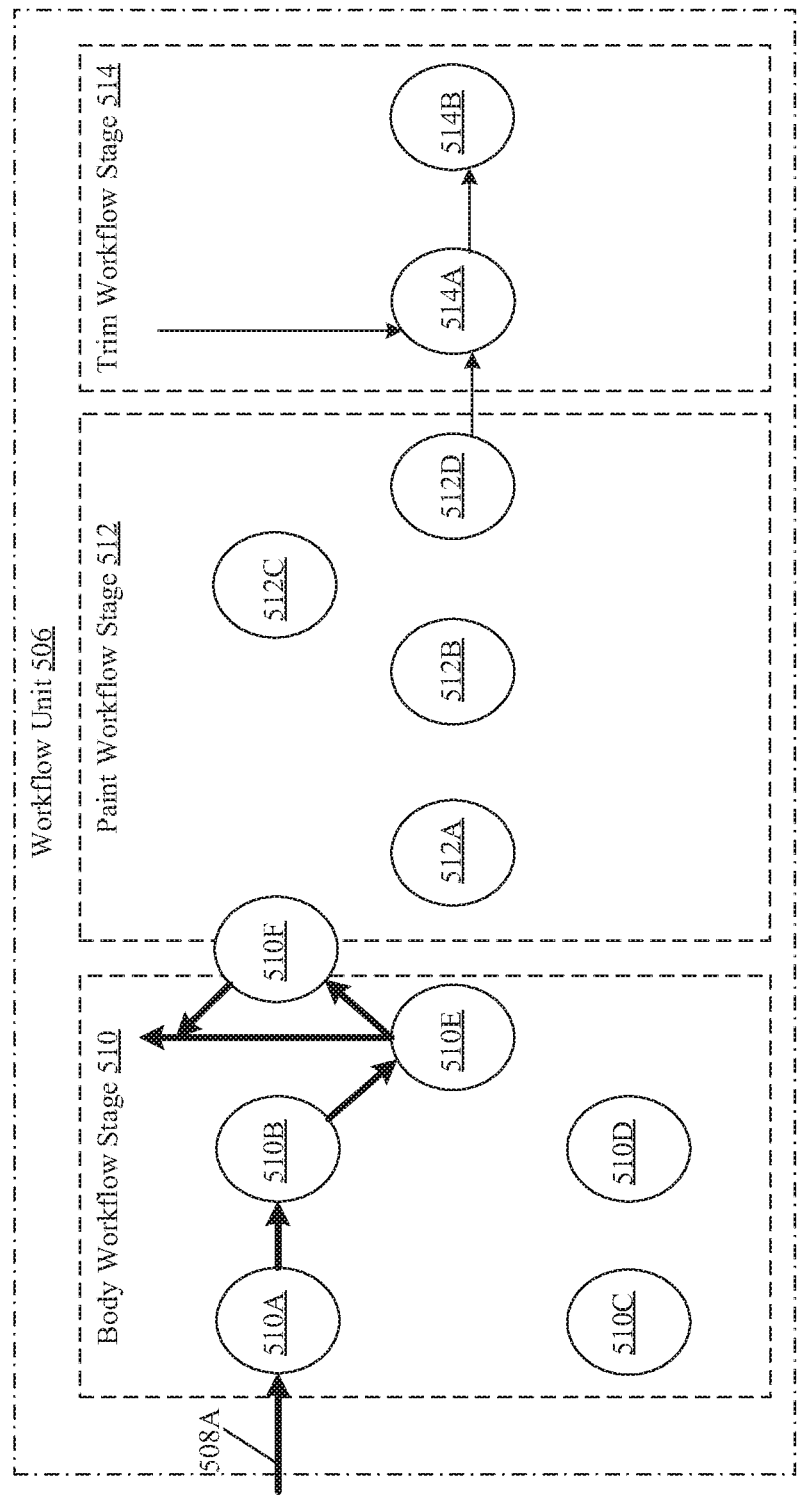
FIG. 5C is a third flow diagram that illustrates an exemplary auto assembly line managed by an exemplary planning and scheduling server, in accordance with an embodiment of the present disclosure.

FIG. 5C is a third flow diagram that illustrates an exemplary auto assembly line managed by an exemplary planning and scheduling server, in accordance with an embodiment of the present disclosure. FIG. 5C is described in conjunction with FIG. 5A and FIG. 5B. With reference to FIG. 5C, there is shown a workflow unit 506 that may be operatively configured as an auto assembly line. The workflow unit 506 is described in an exemplary scenario with presence of ELT workflow stages and applications of one or more ELTs to corresponding slots and lots of the workflow unit.

With reference to FIG. 5C, the workflow unit 506 may comprise partial flows in the HFL of FIG. 5A. The partial flow may be present between a pair of slots, such as the body slot 510E and the trim slot 514A and may correspond to a transition of a product item from a current FL to another FL (not shown), such as an outsourcing facility. As an example, certain workflow units may require special paints that may be more economically applied at an offsite facility. After getting offsite, the outsourced units may rejoin the in-house units on a trim line. Outsourcing facility may add additional delays (for e.g., transportation) and such partial route units may be pulled ahead at the body to make sure the trim sequence can be recreated when the full route units are rejoined.

As another example, in an oil filling and testing station for an engine body assembly, every $10^{th}$ engine of an auto model (A) in the body slot 510E may be required to undergo ignition tests in oil filling and testing facility of another FL (or an outsource test station). The $10^{th}$ engine in the body slot may be pulled directly from the body slot 510E or may be pulled via the branched body slot 510F to a slot in corresponding FL of the oil filling and testing station. Every subsequent engine after or before the $10^{th}$ engine may be moved in accordance with FIG. 5A, without a partial flow into other FLs. The $10^{th}$ engine may be transferred to another slot in the FL, such as the trim slot 514A after a partial flow timeframe, such as "5 hours". The partial flow may be pre-specified by an operation controller via the client device 118 (FIG. 1) or determined from the database 212 (FIG. 2) of TCT or RCT. A VPT may be calculated for the additional delay in a partial flow and a new slot may be evaluated for the $10^{th}$ engine of the auto model (A) in accordance with modifications in the RCT tables and determine a better global optimal workflow sequence.

Figure 6:
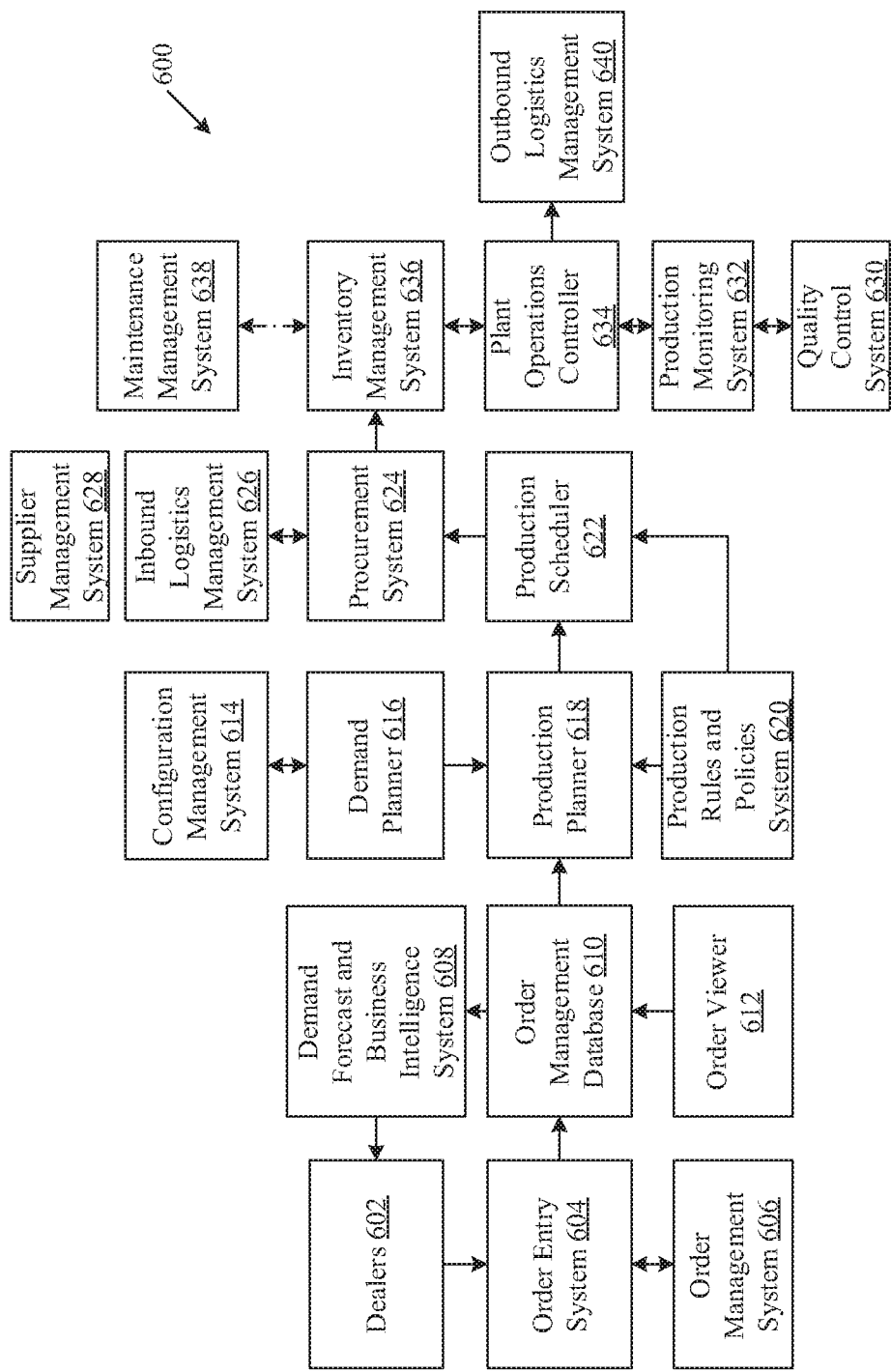
FIG. 6 is a block diagram that illustrates an exemplary order fulfillment landscape of an industrial environment, in accordance with an embodiment of the present disclosure.

FIG. 6 is a block diagram that illustrates an exemplary order fulfillment landscape of an industrial environment, in accordance with an embodiment of the present disclosure. With reference to FIG. 6, there is shown a block diagram 600 of an order fulfillment landscape. The order fulfillment landscape comprises dealers 602, an order entry system 604, an order management system 606, a demand forecast and business intelligence system 608, an order management database 610, an order viewer 612, a configuration management system 614, a demand planner 616, a production planner 618, a production rules and policies system 620, a production scheduler 622, a procurement system 624, an inbound logistics management system 626, a supplier management system 628, a quality control system 630, a production monitoring system 632, a plant operations controller 634, an inventory management system 636, a maintenance management system 638, and an outbound logistics management system 640.

In operation, the dealers 602 may provide one or more orders of one or more product items from a catalogue of product items. A dealer, such as a seller of product items, may raise a purchase order corresponding to the one or more orders of the one or more product items. Each order may be entered at the order entry system 604 associated with the dealers 602. In one scenario, the order entry system 604 may be a web based platform for registration of the one or more orders for the one or more product items in real time. In another scenario, the order entry system 604 may be a kiosk or a standalone order entry device for registration of the one or more orders of the one or more product items. Additionally, the order entry system 604 may provide provisions for payment, modifications, and real time tracking of the one or more orders of the one or more product items. Each order may be managed and assigned into batches for production or assembly in a plant. The order management system 606 may be configured to assign and timestamp the one or more orders and manage the time bound processing of the one or more orders. The order management system 606, in conjunction with the order entry system 604, may provide a point of contact to the one or more dealers. The order entry system 604 may be associated with the order management database 610. The order management database 610 may be configured to store order data, user authentication data and schedules, plans and other operational data. Additionally, an order viewer 612, such as a visualization engine for presentation of data from order management database 610, may be associated with the order management database 610.

The demand forecast and business intelligence system 608 may be associated with the dealers 602 and the order management database 610. A dataset associated with the order s and dealers may be collected by the demand forecast and business intelligence system 608 to identify parameters that affect the demand of certain product items. The dataset from the demand forecast and business intelligence system 608 may be used to calibrate and optimize the capacity, time and performance of the plant. The order management database 610 is associated with the production planner 618. The production planner 618 may be further associated with the demand planner 616 and the production rules and policies system 620. The production planner 618 may be configured to generate production plans for each batch or set of orders to be produced in a given period of time, as described in FIG. 1. The period of time may be divided into bins or shifts, where each shift may be assigned a batch of product items.

The plans may be derived to optimize the performance of the plant. The demand planner 616 may estimate demands of specific or certain set of product items for a future bin of time. The demand planner 616 may be further associated with the configuration management system 614. The configuration management system 614 establishes and maintains consistent quality, durability, and performance of each product item in accordance with functional and physical attributes of the product item.

The production rules and policies system 620 provides a set of constraints associated with the plant operations to the production planner 618 and the production scheduler 622. The production scheduler 622 may be configured to generate automated and optimal global workflow sequence for different production slots in each production zone of the plant. The automated and optimal global workflow sequence may correspond to positions and operations for a specific product item in an assembly line. The production scheduler 622 may further provide the generated and optimal global workflow sequence for the one or more orders corresponding to a specific bin of time to the procurement system 624. The procurement system 624 may be configured to procure a set of components or raw materials for the production of the one or more product items that are specified in the workflow sequences. The procurement system 624 may be further configured to communicate with the inbound logistics management system 626 which may be further configured to communicate with the supplier management system 628. The inbound logistics management system 626 may keep a track of orders of the set of components or raw materials for the production of the one or more product items and may communicate with the supplier management system 628 to obtain real time supply information. The supplier management system 628 may be configured to keep a database of suppliers for each component of the product item and may order a component or a raw material on the basis of a lower bid or contract bid for the component or raw material.

The production scheduler 622 may be further configured to provide the optimal global workflow sequence to the plant operations controller 634. The plant operations controller 634 may be a part of a control system for feedback based control and management of each operation in the plant. The plant operations controller 634 may be operationally managed by the production scheduler 622, and assisted by the production monitoring system 632 and the inventory management system 636. The production monitoring system 632 may be configured to monitor different parameters of production, such as delay, quality, production rate, operational errors, maintenance rate and the like. The production monitoring system 632 may receive inputs related to quality of each produced product item in a current batch of product items. The quality control system 630 may be configured to perform periodic checks on quality of a product item to assess performance and operational efficacy of the plant operations.

The inventory management system 636 may be configured to monitor and manage consumption of the procured components or raw materials from the procurement system 624. The management of inventory consumption, timely delivery to individual zones and operational machinery of the plant is relevant for the inventory management system 636. The maintenance management system 638 may be further configured to raise periodic or feedback based maintenance alerts and timelines for scheduled maintenance of a production tool in the plant. The plant operations controller 634 may be further associated with the outbound logistics management system 640. A set of produced product items for each bin of time may be provided to the outbound logistics management system 640. The outbound logistics management system may identify each produced product with a delivery date or a priority. Accordingly, logistic units, such as storage and transport channels, may be arranged for the storage or delivery of the produced product item back to the dealers 602.

It may be noted that roles of each block in the block diagram 600 of the order fulfillment landscape may not be limited to the aforementioned description and the roles of each block may be more than what is described, without a deviation from scope of the present disclosure.

Figure 7:
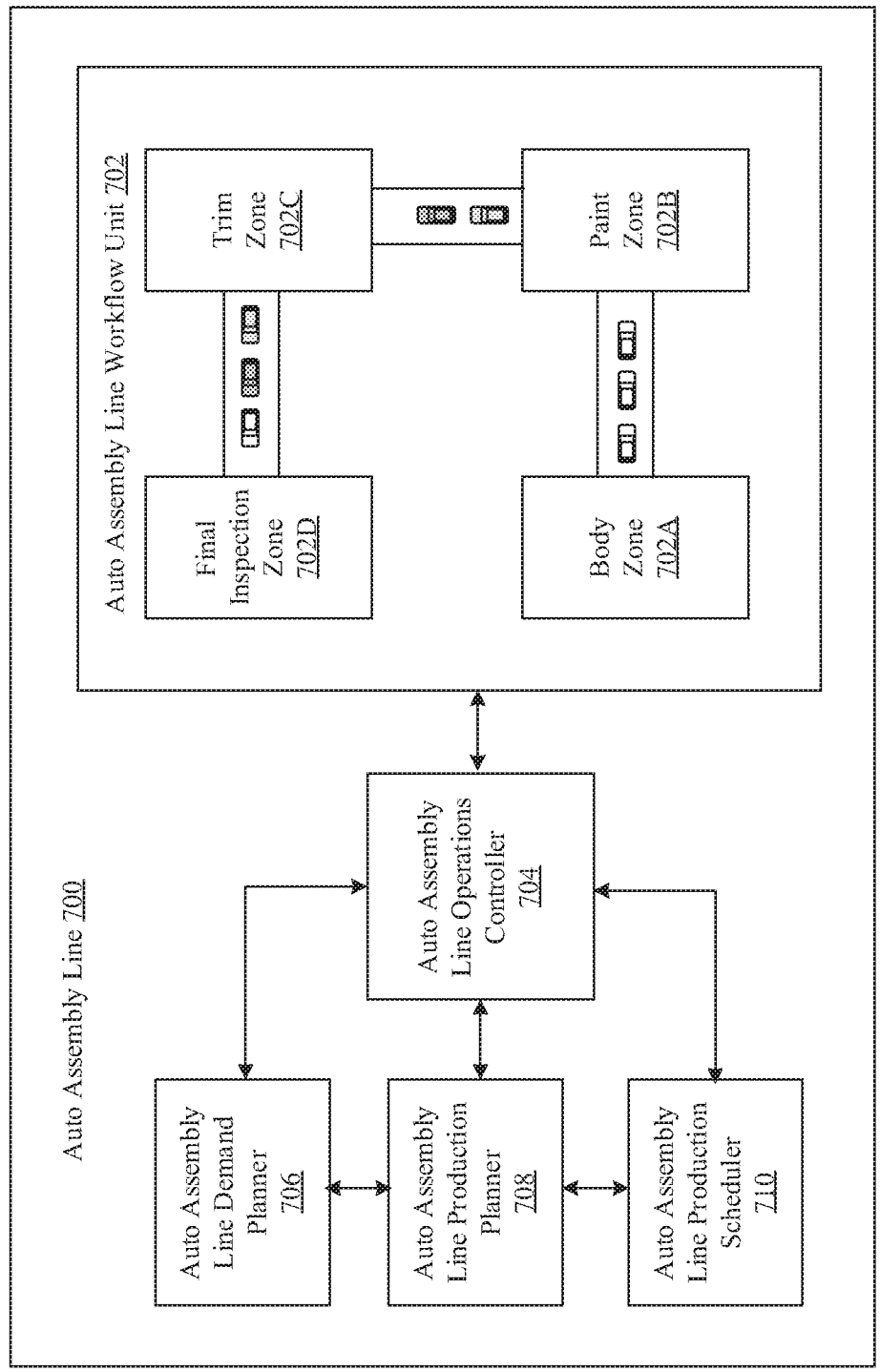
FIG. 7 is a block diagram that illustrates an exemplary operational view of an auto assembly line, in accordance with an embodiment of the present disclosure.

FIG. 7 is a block diagram that illustrates an operational view of an auto assembly line, in accordance with an embodiment of the present disclosure. With reference to FIG. 7, there is shown an auto assembly line 700. The auto assembly line 700 is an exemplary industrial environment with zones, operation control systems and networking devices for performance optimized production of automobiles. The auto assembly line 700 comprises an auto assembly line workflow unit 702 communicatively coupled to an auto assembly line operations controller 704 (similar to the plant operations controller 634 (FIG. 6)), an auto assembly line demand planner 706 (similar to the demand planner 616 (FIG. 6)), an auto assembly line production planner 708 (similar to the production planner 618 (FIG. 6)), and an auto assembly line production scheduler 710 (similar to the production scheduler 622 (FIG. 6)). The auto assembly line workflow unit 702 comprises various stages, such as a body zone 702A, a paint zone 702B, a trim zone 702C, and a final inspection zone 702D for assembly line manufacturing of the automobiles in the auto assembly line 700. The auto assembly line workflow unit 702 may be a configurable unit, where each of the body zone 702A, the paint zone 702B, the trim zone 702C, and the final inspection zone 702D may be communicatively configured to operate in accordance with an optimal global workflow sequence. In accordance with an embodiment, the body zone 702A, the paint zone 702B, the trim zone 702C, and the final inspection zone 702D of the auto assembly line workflow unit 702 may be connected in an SFL.

The auto assembly line demand planner 706, the auto assembly line production planner 708, and the auto assembly line production scheduler 710 may collaboratively be configured to perform one or more operations, such as a determination of demand of different variants of automobiles along with a stipulated delivery time, a generation of workflow plans for different batches of automobiles, a check for inventory items, and a generation of workflow sequences for each of the body zone 702A, the paint zone 702B, the trim zone 702C, and the final assembly zone 702D of the auto assembly line workflow unit 702.

In operation, the auto assembly line production scheduler 710 may select the body zone 702A as a primary zone and the paint zone 702B, the trim zone 702C, and the final inspection zone 702D as one or more secondary zones of the auto assembly line workflow unit 702. The workflow sequence for the body zone 702A may be determined for one or more slots, for example four slots, in the body zone 702A. The workflow sequence may include a slot identifier and a lot identifier, for example, "1001" as a slot identifier and "$OP_4$" as a lot identifier. The slot identifier and the lot identifier may provide a unique position and operational identity to the slot. For example, a first slot in body zone 702A may correspond to a position "1001" for a car model (A) which may be operated upon based on an operation "$OP_1$", a second slot in body zone 702A may correspond to a position "1002" for a car model (B) which may be operated upon based on an operation "$OP_2$", a third slot in body zone 702A may correspond to a position "1003" for a car model (C) which may be operated upon based on an operation "$OP_3$", and a fourth slot in body zone 702A may correspond to a position "1004" for a car model (D) which may be operated upon based on an operation "$OP_4$". The auto assembly line production scheduler 710 generates various candidate workflow sequences based on concurrent transformations of the various moves in the workflow sequences for the body zone 702A. The auto assembly line production scheduler 710 further determines an optimal global workflow sequence for the body zone 702A, the paint zone 702B, the trim zone 702C and the final inspection zone 702D that when executed, results in maximum performance and minimal time penalty.

The auto assembly line operations controller 704 may be configured to control and manage operations of each zone in the auto assembly line workflow unit 702 in accordance with the optimal global workflow sequence, generated and provided by the auto assembly line production scheduler 710. Accordingly, each of the paint zone 702B, the trim zone 702C, and the final inspection zone 702D operate upon the car models to output assembled models of the cars in accordance with the optimal global workflow sequence that best satisfies the constraints applicable to corresponding zone.

In accordance with an embodiment, an ELT zone (not shown), such as a quality control zone, may be present in the auto assembly line workflow unit 702, for application of pull back on certain car models from the assembly line. Such car models may be reassigned a new slot in subsequent zones in accordance with time or route correspondence charts which may be prepared in accordance with the generated workflow sequences and routes.

Figure 8:
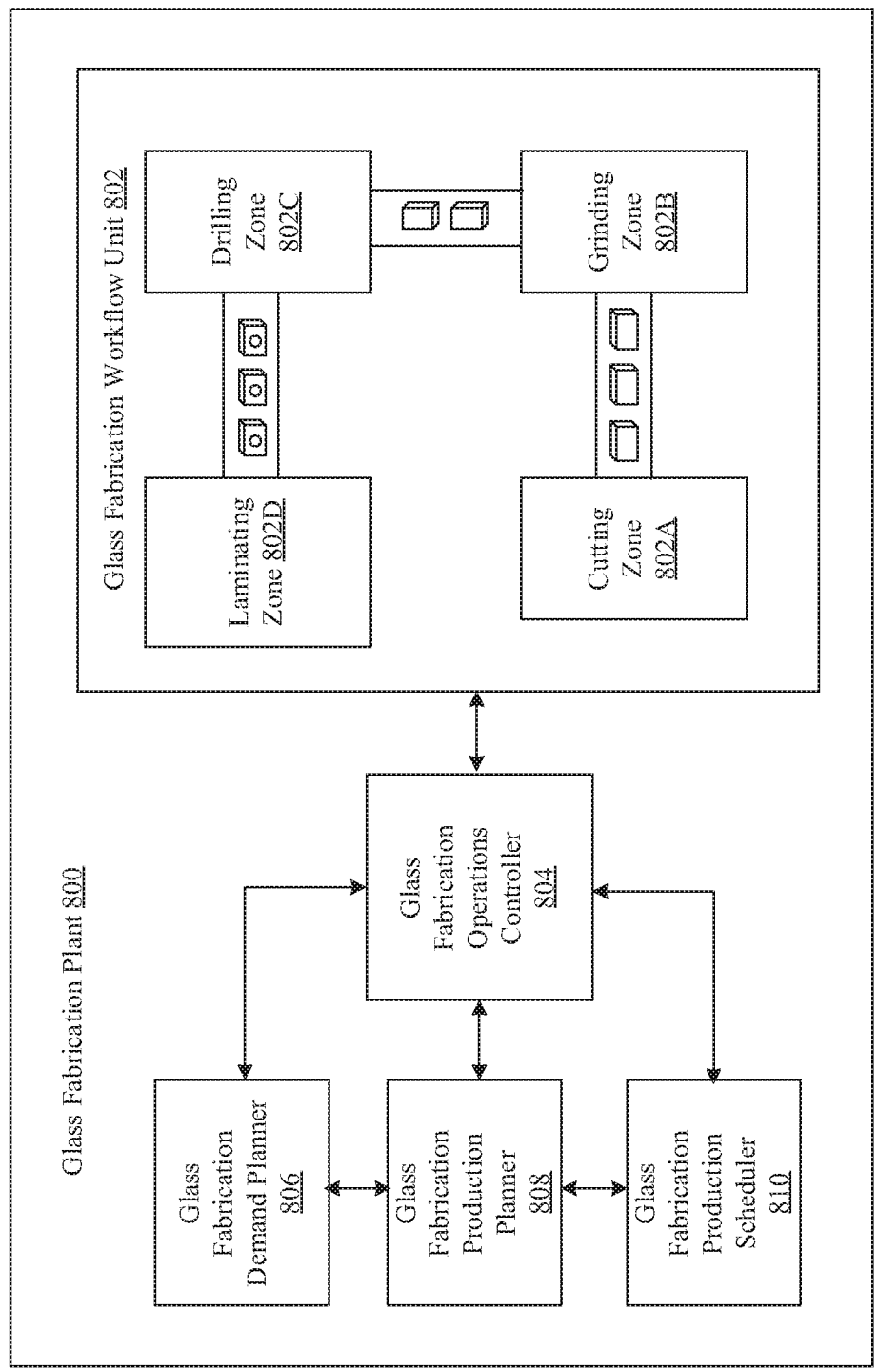
FIG. 8 is a block diagram that illustrates an exemplary operational view of a glass fabrication plant, in accordance with an embodiment of the present disclosure.

FIG. 8 is a block diagram that illustrates an operational view of a glass fabrication plant, in accordance with an embodiment of the present disclosure. With reference to FIG. 8, there is shown a glass fabrication plant 800. The glass fabrication plant 800 is an exemplary industrial environment with zones, operation control systems and networking devices for performance optimized production of glass products. The glass fabrication plant 800 comprises a glass fabrication workflow unit 802 communicatively coupled to a glass fabrication operations controller 804 (similar to the plant operations controller 634 (FIG. 6)), a glass fabrication demand planner 806 (similar to the demand planner 616 (FIG. 6)), a glass fabrication production planner 808 (similar to the production planner 618 (FIG. 6)), and a glass fabrication production scheduler 810 (similar to the production scheduler 622 (FIG. 6)). The glass fabrication workflow unit 802 comprises various stages, such as a cutting zone 802A, a grinding zone 802B, a drilling zone 802C, and a laminating zone 802D for glass fabrication in the glass fabrication plant 800. The glass fabrication workflow unit 802 may be a configurable unit, where each of the cutting zone 802A, the grinding zone 802B, the drilling zone 802C, and the laminating zone 802D may be communicatively configured to operate in accordance with an optimal global workflow sequence. In accordance with an embodiment, the cutting zone 802A, the grinding zone 802B, the drilling zone 802C, and the laminating zone 802D of the glass fabrication workflow unit 802 may be connected in an SFL.

The glass fabrication demand planner 806, the glass fabrication production planner 808, and the glass fabrication production scheduler 810 may collaboratively be configured to perform one or more operations, such as a determination of demand of different variants of glass materials (to be machined) along with a stipulated delivery time, a generation of workflow plans for different batches of fabricated glass products, a check for inventory items, and a generation of workflow sequences for each of the cutting zone 802A, the grinding zone 802B, the drilling zone 802C, and the laminating zone 802D of the glass fabrication workflow unit 802.

In operation, the glass fabrication production scheduler 810 may select the cutting zone 802A as a primary zone and the grinding zone 802B, the drilling zone 802C, and the laminating zone 802D as one or more secondary zones of the glass fabrication workflow unit 802. The workflow sequence for the cutting zone 802A may be determined for one or more slots, for example, four slots, in the cutting zone 802A. The workflow sequence may include a slot identifier and a lot identifier, for example, "2001" as a slot identifier and "$OP_4$" as a lot identifier. The slot identifier and the lot identifier may provide a unique position and operational identity to the slot. For example, a first slot in cutting zone 802A may correspond to a position "2001" for a first glass product (for example, a polished mirror) which may be operated upon based on an operation "$OP_1$", a second slot in cutting zone 802A may correspond to a position "2002" for a second glass product (for example, a prism) which may be operated upon based on an operation "$OP_2$", a third slot in cutting zone 802A may correspond to a position "2003" for a third glass product (for example, a laser lens) which may be operated upon based on an operation "$OP_3$", and a fourth slot in cutting zone 802A may correspond to a position "2004" for a fourth glass product (for example, a telescopic lens) which may be operated upon based on an operation "$OP_4$". The glass fabrication production scheduler 810 generates various candidate workflow sequences based on concurrent transformations of the various moves in the workflow sequence of the cutting zone 802A. The glass fabrication production scheduler 810 further determines an optimal global workflow sequence for the cutting zone 802A, the grinding zone 802B, the drilling zone 802C and the laminating zone 802D that when executed, results in maximum performance and minimal time penalty.

The glass fabrication operations controller 804 may be configured to control and manage computer numerical control (CNC) machine operations of each zone in the glass fabrication workflow unit 802 in accordance with the optimal global workflow sequence, generated, and provided by the glass fabrication production scheduler 810. Such CNC machines may utilize distinctive tooling, which may include diamond abrasive tooling, diamond points and carbide wheels, to achieve better accuracy and glass working capabilities in each zone in the glass fabrication workflow unit 802. Accordingly, each of the grinding zone 802B, the drilling zone 802C, and the laminating zone 802D operate in accordance with the optimal global workflow sequence that best satisfies the constraints applicable to corresponding zone and outputs fabricated glass products (such as telescopes, prisms, laser lenses and mirrors, and other such optics).

In accordance with an embodiment, an ELT zone (not shown), such as a quality control zone, may be present in the glass fabrication workflow unit 802, for application of pull back on certain glass products from the fabrication line. Such glass products may be reassigned a new slot in subsequent zones in accordance with time or route correspondence charts which may be prepared in accordance with the generated workflow sequences and routes.

Figure 9:
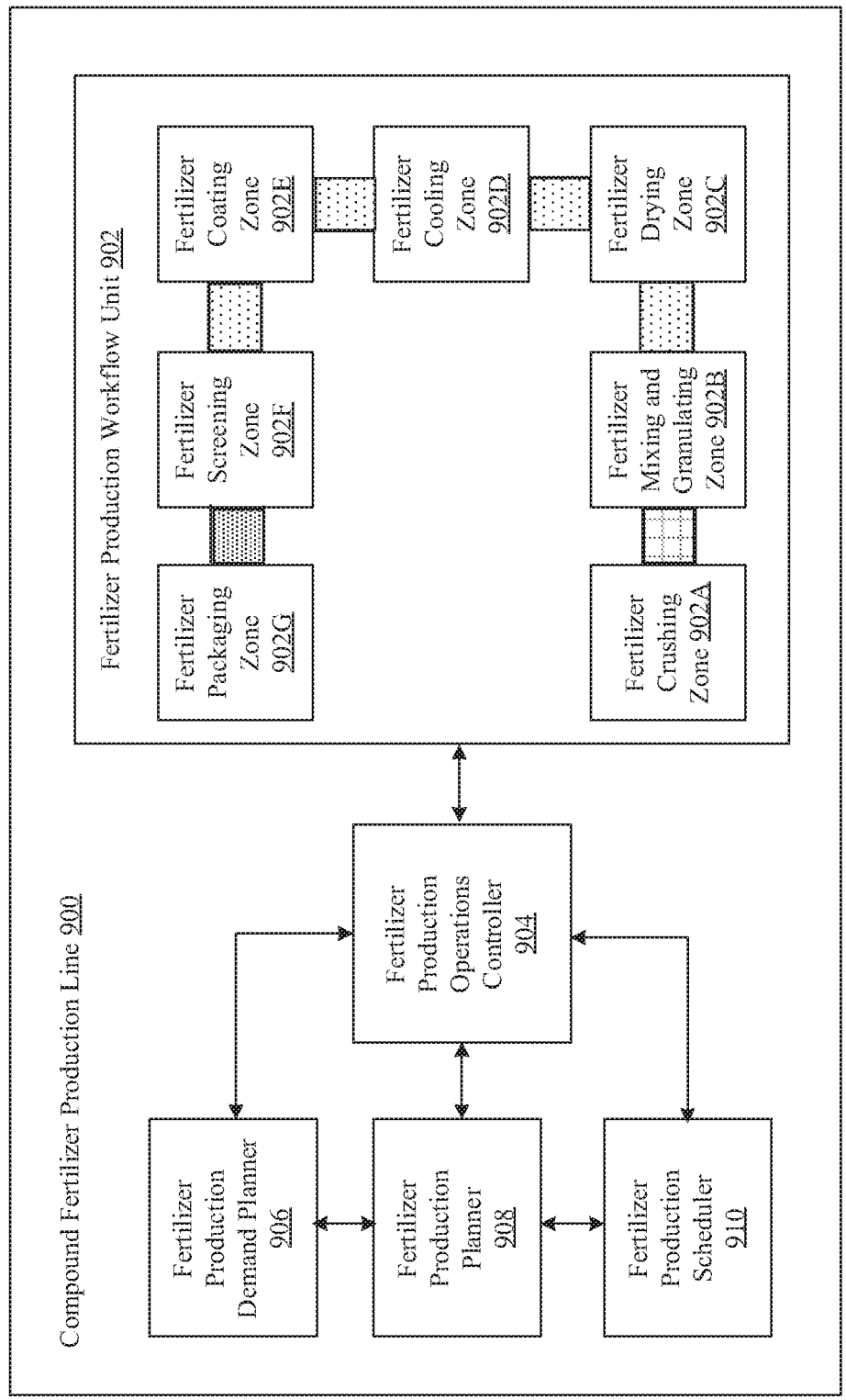
FIG. 9 is a block diagram that illustrates an exemplary operational view of a compound fertilizer production line, in accordance with an embodiment of the present disclosure.

FIG. 9 is a block diagram that illustrates an operational view of a compound fertilizer production line, in accordance with an embodiment of the present disclosure. With reference to FIG. 9, there is shown a compound fertilizer production line 900. The compound fertilizer production line 900 is an exemplary industrial environment with zones, operation control systems and networking devices for performance optimized production of glass products. The compound fertilizer production line 900 comprises a fertilizer production workflow unit 902 communicatively coupled to a fertilizer production operations controller 904 (similar to the plant operations controller 634 (FIG. 6)), a fertilizer production demand planner 906 (similar to the demand planner 616 (FIG. 6)), a fertilizer production planner 908 (similar to the production planner 618 (FIG. 6)), and a fertilizer production scheduler 910 (similar to the production scheduler 622 (FIG. 6)). The fertilizer production workflow unit 902 comprises various stages, such as a fertilizer crushing zone 902A, a fertilizer mixing and granulating zone 902B, a fertilizer drying zone 902C, a fertilizer cooling zone 902D, a fertilizer coating zone 902E, a fertilizer screening zone 902F, and a fertilizer packaging zone 902G for fertilizer production in the compound fertilizer production line 900.

The fertilizer production workflow unit 902 may be a configurable unit, where each of the fertilizer crushing zone 902A, the fertilizer mixing and granulating zone 902B, the fertilizer drying zone 902C, the fertilizer cooling zone 902D, the fertilizer coating zone 902E, the fertilizer screening zone 902F, and the fertilizer packaging zone 902G may be communicatively configured to operate in accordance with an optimal global workflow sequence. In accordance with an embodiment, the fertilizer crushing zone 902A, the fertilizer mixing and granulating zone 902B, the fertilizer drying zone 902C, the fertilizer cooling zone 902D, the fertilizer coating zone 902E, the fertilizer screening zone 902F, and the fertilizer packaging zone 902G of the fertilizer production workflow unit 902 may be connected in an SFL.

The fertilizer production demand planner 906, the fertilizer production planner 908, and the fertilizer production scheduler 910 may collaboratively be configured to perform one or more operations, such as a determination of demand of different variants of compound fertilizers (to be produced) along with a stipulated delivery time, a generation of workflow plans for different batches of compound fertilizers, a check for inventory items, and a generation of workflow sequences for each of the fertilizer crushing zone 902A, the fertilizer mixing and granulating zone 902B, the fertilizer drying zone 902C, the fertilizer cooling zone 902D, the fertilizer coating zone 902E, the fertilizer screening zone 902F, and the fertilizer packaging zone 902G of the fertilizer production workflow unit 902.

In operation, the fertilizer production scheduler 910 may select the fertilizer crushing zone 902A as a primary zone and the fertilizer mixing and granulating zone 902B, the fertilizer drying zone 902C, the fertilizer cooling zone 902D, the fertilizer coating zone 902E, the fertilizer screening zone 902F, and the fertilizer packaging zone 902G as one or more secondary zones of the fertilizer production workflow unit 902. The workflow sequence for the fertilizer crushing zone 902A may be determined for one or more slots, for example four slots, in the fertilizer crushing zone 902A. The workflow sequence may include a slot identifier and a lot identifier, for example, "3001" as a slot identifier and "$OP_1$" as a lot identifier. The slot identifier and the lot identifier may provide a unique position and operational identity to the slot.

For example, a first slot in fertilizer crushing zone 902A may correspond to a position "3001" for a first compound fertilizer product (for example, phosphate fertilizer) which may be operated upon based on an operation "$OP_1$", a second slot in fertilizer crushing zone 902A may correspond to a position "3002" for a second compound fertilizer product (for example, potash fertilizer) which may be operated upon based on an operation "$OP_2$", and a third slot in fertilizer crushing zone 902A may correspond to a position "2003" for a third compound fertilizer product (for example, nitrogen fertilizer) which may be operated upon based on an operation "$OP_3$". The fertilizer production scheduler 910 generates various candidate workflow sequences based on concurrent transformations of the workflow sequences for various moves in the workflow sequence of the fertilizer crushing zone 902A. The fertilizer production scheduler 910 further determines an optimal global workflow sequence for the fertilizer crushing zone 902A, the fertilizer mixing and granulating zone 902B, the fertilizer drying zone 902C, the fertilizer cooling zone 902D, the fertilizer coating zone 902E, the fertilizer screening zone 902F, and the fertilizer packaging zone 902G that when executed, results in maximum performance and minimal time penalty.

The fertilizer production operations controller 904 may be configured to control and manage operations of various machines (such as fertilizer mixing machine, fertilizer crushing machine, fertilizer mixing machine, rotary drum granulator, rotary drum drying machine, rotary drum cooling machine, fertilizer coating machine, rotary screening machine, and fertilizer packaging machine) in each zone in the fertilizer production workflow unit 902 in accordance with the optimal global workflow sequence, generated and provided by the fertilizer production scheduler 910. Accordingly, each of the fertilizer crushing zone 902A, the fertilizer mixing and granulating zone 902B, the fertilizer drying zone 902C, the fertilizer cooling zone 902D, the fertilizer coating zone 902E, the fertilizer screening zone 902F, and the fertilizer packaging zone 902G operate in accordance with the optimal global workflow sequence that best satisfies the constraints applicable to corresponding zone and outputs compound fertilizers (such as potash fertilizers, nitrate fertilizers, and phosphate fertilizers).

Figure 10:
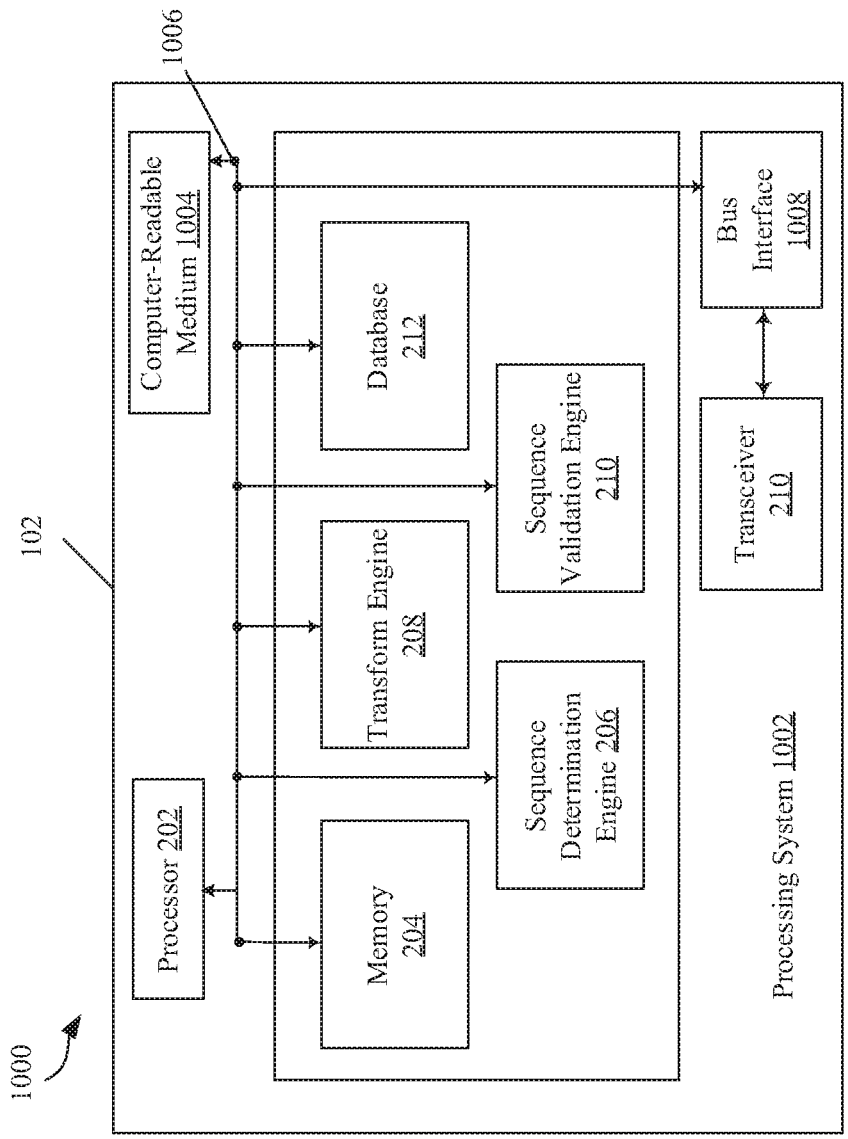
FIG. 10 is a conceptual diagram illustrating an example of a hardware implementation for a planning and scheduling system for generation of a global workflow sequence for multiple workflow stages in an industrial environment, in accordance with an embodiment of the disclosure.

FIG. 10 is a conceptual diagram illustrating an example of a hardware implementation for a planning and scheduling system for generation of a global workflow sequence for multiple workflow stages in an industrial environment, in accordance with an embodiment of the disclosure. Referring to FIG. 10, the hardware implementation shown by a representation 1000 for the planning and scheduling server 102 employs a processing system 1002 for dynamically generating a global workflow sequence for multiple workflow stages in an industrial environment, in accordance with an exemplary embodiment of the disclosure, as described herein. In some examples, the processing system 1002 may comprise a non-transitory computer-readable medium 1004, a hardware processor 202, a hardware memory 204, a hardware sequence determination engine 206, a hardware transform engine 208, a hardware sequence validation engine 210, and the hardware database 212.

In this example, the planning and scheduling server 102 employing the processing system 1002 may be implemented with bus architecture, represented generally by bus 1006. The bus 1006 may include any number of interconnecting buses and bridges depending on the specific implementation of the planning and scheduling server 102 and the overall design constraints. The bus 1006 links together various circuits including the one or more processors, represented generally by the hardware processor 202, the non-transitory computer-readable media, represented generally by the computer-readable medium 1004, the hardware sequence determination engine 206, the hardware transform engine 208, the hardware sequence validation engine 210, and the hardware database 212 which may be configured to carry out one or more operations or methods described herein. A bus interface 1008 provides an interface between the bus 1006 and the transceiver 210. The transceiver 210 provides communicating via the communication network 116 with various other apparatus, such as the order assessment server 104, the operations server 106, the monitoring server 108, and the data server 110.

The hardware processor 202 may be configured to manage the bus 1006 and general processing, including the execution of a set of instructions stored on the computer-readable medium 1004. The set of instructions, when executed by the hardware processor 202, causes the planning and scheduling server 102 to execute the various functions described herein for any particular apparatus. The computer-readable medium 1004 may also be used for storing data that is manipulated by the hardware processor 202 when executing the set of instructions. The computer-readable medium 1004 may also be configured to store data for one or more of the hardware sequence determination engine 206, the hardware transform engine 208, the hardware sequence validation engine 210, and the hardware database 212.

In an aspect of the disclosure, the hardware processor 202, the computer-readable medium 1004, or a combination of both may be configured or otherwise specially programmed to execute the operations or functionality of the hardware sequence determination engine 206, the hardware transform engine 208, the hardware sequence validation engine 210, and the hardware database 212, or various other components described herein. For example, the hardware processor 202, the computer-readable medium 1004, or a combination of both may be configured or otherwise specially programmed to perform the operations and functionality of the hardware sequence determination engine 206, the hardware transform engine 208, the hardware sequence validation engine 210, and the hardware database 212 as described with respect to FIGS. 1, 2, 3A, 3B, 3C, 4A, 4B, 5A, 5B, 5C, 6, 7, 8, and 9.

The present disclosure provides specific improvements to the functioning of a computer, in accordance with various embodiments. For interdependent granular sub-problems, the existing systems provide solutions that utilize substantial memory and thus slower processing time. Significant delays are observed while generating the solution due to intermittent delays in the serial processing of the granular sub-problems in the chain. In contrast, the present disclosure provides near-optimal global workflow sequence that is dynamically generated at run time, thereby utilizing less memory than would otherwise be required as in the existing systems. Therefore, various embodiments of the present disclosure exclude redundancies, and exhibits reduced memory requirement and faster computation time (i.e. faster processing time) for concurrent generation of workflow sequences, without sacrificing optimality and efficiency. Such workflow sequences are global optimum sequences and therefore, the operational delay is minimal.

Further, the present disclosure provides various improvements in the technology. For interdependent granular sub-problems, the existing systems provide solutions that are sub-optimal and inefficient due to violation of constraints associated with the sub-problems. In such scenarios, the solutions often result in higher costs due to wastage of inventories, excessive manpower, reduced throughput, missed delivery dates, material wastage, and supply chain instability. Further existing systems are not able to adequately support re-entrant flows, and time consuming manual intervention is required. In contrast, present disclosure provides near-optimal global workflow sequence which is comparatively fast, computationally efficient, impactful, effective, and relevant for current workflow sequence and others workflow sequences associated with the current workflow sequence. The system and method in the present disclosure simultaneously generate workflow schedules for corresponding to real-world topologies of arbitrary combinations of serial and parallel workflow stages of one or more workflow units. Thus, the system and method in the present disclosure are enabled to support real-world routes of operations through various topologies, which include one pass, two pass, multi-pass, re-entrant flows, partial routes, and the like.

The present disclosure further enables a system that provides both an economic and a cost advantage, and at the same time ensures that a right workflow sequence is executed at right time for the right stakeholders. Additionally, different constraints for each workflow stage are well compensated in the generated workflow sequences such that violations of constraints are minimal. The inclusion of correspondence tables, such as the timing correspondence table and the routing correspondence tables facilitate adaptability of each workflow unit to different operational situations, such as changing capacities, buffer sizes, route changes etc. Such correspondence tables further compensate such operational situations and delays with assignment of new routes, slots or pull backs to maintain performance, quality and on time delivery of operated product items. Further, the use of transforms efficiently captures various dependencies of the workflow sequences between the workflow stages, such as extended lead times, differing process times by stage, and re-entrant flows.

Various embodiments of the present disclosure comprise the planning and scheduling server 102 that may be configured to determine a first workflow sequence for a primary workflow stage of a workflow unit for a plurality of product items. The first workflow sequence is in accordance with a first set of constraints associated with the primary workflow stage. The planning and scheduling server 102 may be further configured to generate one or more second workflow sequences for one or more secondary workflow stages of the workflow unit concurrently, based on a transformation of the determined first workflow sequence. The generated one or more second workflow sequences may be in accordance with corresponding one or more second set of constraints associated with the one or more secondary workflow stages. The first workflow sequence and the one or more second workflow sequences may be dependent on one another. The planning and scheduling server 102 may be further configured to obtain a global workflow sequence for the primary workflow stage and the one or more secondary workflow stages based on at least the determined first workflow sequence for the primary workflow stage and the generated one or more second workflow sequences for one or more secondary workflow stages of the workflow unit. The planning and scheduling server 102 may be further configured to control execution of a set of operations for the plurality of product items based on the obtained global workflow sequence to maximize a performance score for the executed set of operations on the plurality of product items.

Various embodiments of the present disclosure provide a non-transitory computer-readable medium having stored thereon, computer implemented instruction that when executed by a processor causes the planning and scheduling server 102 to execute various operations. The planning and scheduling server 102 may execute operations comprising determining a first workflow sequence for a primary workflow stage of a workflow unit for a plurality of product items. The first workflow sequence may be in accordance with a first set of constraints associated with the primary workflow stage. The planning and scheduling server 102 may execute further operations comprising generating one or more second workflow sequences for one or more secondary workflow stages of the workflow unit concurrently, based on a transformation of the determined first workflow sequence. The generated one or more second workflow sequences may be in accordance with corresponding one or more second set of constraints associated with the one or more secondary workflow stages. The first workflow sequence and the one or more second workflow sequences may be dependent on one another. The planning and scheduling server 102 may execute further operations comprising obtaining a global workflow sequence for the primary workflow stage and the one or more secondary workflow stages based on at least the determined first workflow sequence for the primary workflow stage and the generated one or more second workflow sequences for one or more secondary workflow stages of the workflow unit. The planning and scheduling server 102 may execute further operations comprising executing a set of operations for the plurality of product items based on the obtained global workflow sequence to maximize a performance score for the executed set of operations on the plurality of product items.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g. and for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the present disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the present disclosure may provide a non-transitory machine and/or computer readable storage and/or media, having stored thereon, a machine code and/or a computer program having at least one code section executable by a machine and/or a computer, thereby causing the machine and/or computer to perform the steps as described herein to obtain a global workflow sequence.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the present disclosure described herein need not be performed in any particular order. Furthermore, although elements of the present disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
a memory configured to store instructions; and
a processor in a computing device associated with an industrial environment, the industrial environment includes a plurality of machines, wherein the processor is configured to execute the instructions, and based on the executed instructions, the processor is further configured to:
store, in a database, a plurality of orders received for a plurality of product items produced in the industrial environment from an input/output (I/O) device, via a communication network;
determine a first workflow sequence for a primary workflow stage of a workflow unit for the plurality of product items based on a minimal violation of at least one of a first set of constraints associated with the primary workflow stage, wherein
the minimal violation of the at least one of the first set of constraints is represented by at least a time delay,
generate one or more second workflow sequences for one or more secondary workflow stages of the workflow unit concurrently with the determination of the first workflow sequence, wherein the generation of the one or more second workflow sequences is based on a transformation of the first workflow sequence according to a combination of:
multiple threads selected from a defined thread pool in the memory based on a specification of the processor, and the multiple threads optimally allocated to one or more instances of a transformation engine for the transformation,
a set of interdependent constraints of the first workflow sequence and the one or more second workflow sequences retrieved from the database,
operational factors retrieved from the database, and
a selection of transformation technique associated with a set of computations of one or more sequence parameters, wherein
the selection of the transformation technique is based on the set of interdependent constraints, and one or more correspondence tables retrieved from the database, and
the one or more sequence parameters include at least a sequential displacement factor associated with a sequential displacement corresponding to each of the one or more secondary workflow stages, a priority factor, and an engineering change boundary (ECB), and
the ECB indicates:
a boundary ahead of which the sequential displacement is inapplicable, and
a boundary condition for segregation of the plurality of product items based on an engineering criteria;
evaluate the one or more second workflow sequences concurrently with the first workflow sequence based on at least the sequential displacement;
obtain a global workflow sequence for the primary workflow stage and the one or more secondary workflow stages at run time based on the evaluation of the one or more second workflow sequences concurrently with the first workflow sequence;
execute a set of operations on the plurality of machines to produce the plurality of product items, wherein the execution of the set of operations is based on the global workflow sequence;
manage a set of parameters that corresponds to timing offsets by which the first workflow sequence is related with the one or more secondary workflow stages,
wherein the set of parameters are associated with the set of operations for the production of the plurality of product items;
control the execution of the set of operations on the plurality of product items to maximize a performance score for the set of operations, wherein the control of the execution of the set of operations is based on the set of parameters and a penalty score; and
display visualization of the set of operations for the maximized performance score for the production of the plurality of product items, wherein the display of the visualization of the set of operations is based on the obtained global workflow sequence and data retrieved from the database.

2. The system according to claim 1, wherein
the obtained global workflow sequence for the primary workflow stage and the one or more secondary workflow stages corresponds to a global schedule for the production of the plurality of product items, and
the global schedule comprises a plurality of time durations for different jobs in the primary workflow stage and the one or more secondary workflow stages.

3. The system according to claim 1, wherein the one or more second workflow sequences are dependent on the first workflow sequence based on at least one of a pull ahead, a number of flow routes, a re-entrant flow, or a partial route.

4. The system according to claim 1, wherein the processor is further configured to retrieve content from a memory device for the determination of the first workflow sequence for the primary workflow stage of the workflow unit.

5. The system according to claim 1, wherein
the first workflow sequence corresponds to a plurality of primary slots,
each of the plurality of primary slots indicates a physical location of one of a component of a corresponding product item from the plurality of product items or a corresponding in-operation product item from the plurality of product items in the primary workflow stage,
each of the one or more second workflow sequences corresponds to a secondary slot from a plurality of secondary slots, each of the plurality of secondary slots indicates one of a component of a corresponding product item from the plurality of product items or a corresponding in-operation product item from the plurality of product items in one of the one or more second workflow stages, the first workflow sequence further corresponds to a primary lot that indicates one of a type or features of a job to be performed in the primary workflow stage, and each of the one or more second workflow sequences further corresponds to a secondary lot that indicates a job to be performed in a corresponding secondary workflow stage of the one or more secondary workflow stages.

6. The system according to claim 5, wherein the processor is further configured to determine a location of the secondary lot of a corresponding second workflow sequence from the one or more second workflow sequences based on an application of the sequential displacement from a current secondary slot from the plurality of secondary slots.

7. The system according to claim 5, wherein the processor is further configured to generate the one or more second workflow sequences for the one or more secondary workflow stages of the workflow unit in one of a first pass or a second pass.

8. The system according to claim 7, wherein the processor is further configured to assign the secondary lot of a corresponding second workflow sequence from the one or more second workflow sequences with a non-zero sequential displacement to a corresponding secondary slot in the first pass.

9. The system according to claim 7, wherein the processor is further configured to assign the secondary lot of a corresponding second workflow sequence from the one or more second workflow sequences with a zero sequential displacement to an available secondary slot in the second pass.

10. The system according to claim 5, wherein the processor is further configured to:
evaluate a net sequential displacement for each secondary lot in each secondary workflow stage of the one or more secondary workflow stages;
determine a position of the secondary slot from the plurality of secondary slots based on the net sequential displacement; and
check whether a number of the secondary slot is one of less than or greater than a defined ECB associated with the ECB, wherein
the secondary slot is assigned with one of a first available slot or a specific slot, available next to the defined ECB, in a case where the number of the secondary slot is less than the defined ECB.

11. The system according to claim 1, wherein the processor is further configured to:
determine a first primary slot from a plurality of primary slots in the primary workflow stage for each of a plurality of secondary slots in each of the one or more secondary workflow stages based on a correspondence table from the one or more correspondence tables;
determine a primary lot for the first primary slot based on an analysis of the first workflow sequence for the primary workflow stage; and
determine a secondary lot, in each of the one or more secondary workflow stages, that corresponds to the primary lot,
wherein the sequential displacement is based on at least one of an extended lead time, an extended lag time, or a variable process time in which the one or more second workflow sequences are determined with respect to the first workflow sequence.

12. The system according to claim 11, wherein the sequential displacement is a positive sequential displacement with an extended lead time.

13. The system according to claim 11, wherein the correspondence table corresponds to at least one of a timing correspondence table (TCT) or a routing correspondence table (RCT).

14. The system according to claim 13, wherein the TCT is a data structure that comprises a mapping of each of the plurality of secondary slots in each of the one or more secondary workflow stages with a corresponding second primary slot of the plurality of primary slots in the primary workflow stage in absence of the sequential displacement.

15. The system according to claim 13, wherein the RCT is a data structure that comprises a mapping of each of the plurality of secondary slots in each of the one or more secondary workflow stages with a corresponding second primary slot of the plurality of primary slots in the primary workflow stage based on the sequential displacement applied to the TCT.

16. The system according to claim 1, wherein the processor is further configured to:
generate a new first workflow sequence for the primary workflow stage; and
generate one or more new second workflow sequences for the one or more secondary workflow stages based on a new transformation of the new first workflow sequence.

17. The system according to claim 16, wherein the processor is further configured to:
evaluate the new first workflow sequence and the one or more new second workflow sequences;
obtain a new penalty score for each workflow stage of the primary workflow stage and the one or more secondary workflow stages based on the evaluation of the new first workflow sequence and the one or more new second workflow sequences;
determine a cumulative penalty score for the primary workflow stage and the one or more secondary workflow stages; and
accept the new first workflow sequence and the one or more new second workflow sequences based on the cumulative penalty score, wherein
the new first workflow sequence and the one or more new second workflow sequences correspond to the obtained global workflow sequence; and
update the first workflow sequence and the one or more second workflow sequences with the new first workflow sequence and the one or more new second workflow sequences, respectively, and
the update of the first workflow sequence and the one or more second workflow sequences is based on the acceptance of the new first workflow sequence and the one or more new second workflow sequences.

18. The system according to claim 16, wherein
the new transformation of the new first workflow sequence is re-calculated based on a modification in the determined first workflow sequence, and
an extended lead time is based on
a plurality of primary slots and a plurality of primary slots in the primary workflow stage, and
a plurality of secondary slots and a plurality of secondary lots in the one or more secondary workflow stages.

19. The system according to claim 18, wherein the new transformation of the new first workflow sequence is pre-calculated once.

20. The system according to claim 1, wherein
the primary workflow stage and the one or more secondary workflow stages correspond to at least one of a sequential, a parallel, or a hybrid arrangement of workflow stages in the workflow unit, and
the workflow unit corresponds to at least one of a manufacturing unit, a fabrication unit, or an assembly unit of the plurality of product items.

21. The system according to claim 1, wherein
the transformation of the first workflow sequence to the one or more second workflow sequences is at least one of a parallelized type or a multi-threaded type, and
the transformation of the first workflow sequence to the one or more second workflow sequences captures dependencies between the first workflow sequence of the primary workflow stage and the one or more second workflow sequences of the one or more secondary workflow stages as one of extended lead times or variable process times.

22. The system according to claim 1, wherein
the first workflow sequence is determined based on a criteria, and
the criteria is defined with reference to the set of operations on the plurality of product items in the workflow unit.

23. The system according to claim 1, wherein
each dependency across the global workflow sequence is represented by an optimization process as a series of a plurality of transformations, and
operation of the workflow unit is in one or more workflow configurations for each workflow stage of the primary workflow stage and the one or more secondary workflow stages based on an operational condition, the set of operations, and a configuration of flow lines for each product item of the plurality of product items.

24. The system according to claim 23, wherein the workflow unit is operated, in conjunction with addition of one or more extended lead times and parallel flow lines in a hybrid flow line at one or more workflow stages, in a first workflow configuration from the one or more workflow configurations.

25. The system according to claim 23, wherein the workflow unit is operated, in conjunction with addition of one or more extended lead times and re-entrant flows in a hybrid flow line at one or more workflow stages, in a second workflow configuration from the one or more workflow configurations.

26. The system according to claim 23, wherein the workflow unit is operated, in conjunction with addition of one or more extended lead times and partial flows in a hybrid flow line at one or more workflow stages, in a third workflow configuration from the one or more workflow configurations.

27. The system according to claim 1, wherein the engineering criteria corresponds to at least one of a product design or a design year and month.

28. The system according to claim 1, wherein
the processor is further configured to determine the first workflow sequence based on a meta-heuristic technique, and
the meta-heuristic technique includes at least one stochastic optimization, ant colony optimization, or particle swarm optimization.

29. The system according to claim 1, wherein the processor is further configured to:
monitor the execution of the set of operations based on the global workflow sequence at each of a plurality of pay-points, and
each of the plurality of pay-points corresponds to a checkpoint in a virtual flow line for measurement of entry time and exit time of each product item of the plurality of product items.

30. A method, comprising:
storing, by a processor, a plurality of orders in a database for a plurality of product items produced in an industrial environment from an input/output (I/O) device, via a communication network;
determining, by the processor, a first workflow sequence for a primary workflow stage of a workflow unit for the plurality of product items based on a minimal violation of at least one of a first set of constraints associated with the primary workflow stage, wherein
the minimal violation of the at least one of the first set of constraints is represented by at least a time delay;
generating, by the processor, one or more second workflow sequences for one or more secondary workflow stages of the workflow unit concurrently with the determination of the first workflow sequence, wherein the generation of the one or more second workflow sequences is based on a transformation of the first workflow sequence according to a combination of:
multiple threads selected from a defined thread pool in a memory based on a specification of the processor, and the multiple threads optimally allocated to one or more instances of a transformation engine for the transformation,
a set of interdependent constraints of the first workflow sequence and the one or more second workflow sequences retrieved from the database,
operational factors retrieved from the database, and
a selection of transformation technique associated with a set of computations of one or more sequence parameters, wherein
the selection of the transformation technique is based on the set of interdependent constraints, and one or more correspondence tables retrieved from the database, and
the one or more sequence parameters include at least a sequential displacement factor associated with a sequential displacement corresponding to each of the one or more secondary workflow stages, a priority factor, and an engineering change boundary (ECB), and
the ECB indicates:
a boundary ahead of which the sequential displacement is inapplicable, and
a boundary condition for segregation of the plurality of product items based on an engineering criteria;
evaluating, by the processor, the one or more second workflow sequences concurrently with the first workflow sequence based on at least the sequential displacement;
obtaining, by the processor, a global workflow sequence for the primary workflow stage and the one or more secondary workflow stages at run time based on the evaluation of the one or more second workflow sequences concurrently with the first workflow sequence;

executing, by the processor, a set of operations on a plurality of machines to produce the plurality of product items, wherein the execution of the set of operations is based on the global workflow sequence;

managing, by the processor, a set of parameters that corresponds to timing offsets by which the first workflow sequence is related with the one or more secondary workflow stages,
- wherein the set of parameters are associated with the set of operations for the production of the plurality of product items;

controlling, by the processor, the execution of the set of operations on the plurality of product items to maximize a performance score for the set of operations, wherein the control of the execution of the set of operations is based on the set of parameters and a penalty score; and displaying, by the processor, visualization of the set of operations for the maximized performance score for the production of the plurality of product items, wherein the display of the visualization of the set of operations is based on the global workflow sequence and data retrieved from the database.

31. A non-transitory computer-readable medium having stored thereon, computer executable instruction that when executed by a computer, cause the computer to execute instructions, the instructions comprising:

storing, in a database, a plurality of orders received for a plurality of product items produced in an industrial environment from an input/output (I/O) device, via a communication network, wherein the computer is associated with the industrial environment that includes a plurality of machines;

determining a first workflow sequence for a primary workflow stage of a workflow unit for the plurality of product items based on a minimal violation of at least one of a first set of constraints associated with the primary workflow stage, wherein
- the minimal violation of the at least one of the first set of constraints is represented by at least a time delay;

generating one or more second workflow sequences for one or more secondary workflow stages of the workflow unit concurrently with the determination of the first workflow sequence, wherein the generation of the one or more second workflow sequences is based on a transformation of the first workflow sequence according to a combination of:
- multiple threads selected from a defined thread pool in a memory based on a specification of a processor, and the multiple threads optimally allocated to one or more instances of a transformation engine for the transformation,
- a set of interdependent constraints of the first workflow sequence and the one or more second workflow sequences retrieved from the database,
- operational factors retrieved from the database, and
- a selection of transformation technique associated with a set of computations of one or more sequence parameters, wherein
  - the selection of the transformation technique is based on the set of interdependent constraints, and one or more correspondence tables retrieved from the database, and
  - the one or more sequence parameters include at least a sequential displacement factor associated with a sequential displacement corresponding to each of the one or more secondary workflow stages, a priority factor, and an engineering change boundary (ECB), and
  - the ECB indicates:
    - a boundary ahead of which the sequential displacement is inapplicable, and
    - a boundary condition for segregation of the plurality of product items based on an engineering criteria;

evaluating the one or more second workflow sequences concurrently with the first workflow sequence based on at least the sequential displacement;

obtaining a global workflow sequence for the primary workflow stage and the one or more secondary workflow stages at run time based on the evaluation of the one or more second workflow sequences concurrently with the first workflow sequence;

executing a set of operations on the plurality of machines to produce the plurality of product items, wherein the execution of the set of operations is based on the global workflow sequence;

managing a set of parameters that corresponds to timing offsets by which the first workflow sequence is related with the one or more secondary workflow stages,
- wherein the set of parameters are associated with the set of operations for the production of the plurality of product items;

controlling the execution of the set of operations on the plurality of product items to maximize a performance score for the set of operations, wherein the control of the execution of the set of operations is based on the set of parameters and a penalty score; and displaying visualization of the set of operations for the maximized performance score for the production of the plurality of product items, wherein the display of the visualization of the set of operations is based on the global workflow sequence and data retrieved from the database.

* * * * *